(12) United States Patent
Yeon et al.

(10) Patent No.: US 8,731,596 B2
(45) Date of Patent: May 20, 2014

(54) LTE-A SYSTEM AND UPLINK POWER CONTROL METHOD THEREOF

(75) Inventors: Myung Hoon Yeon, Yongin-si (KR); Joon Young Cho, Suwon-si (KR); Jin Kyu Han, Seoul (KR); Youn Sun Kim, Seongnam-si (KR); Jianzhong Zhang, Richardson, TX (US)

(73) Assignee: Samsung Electronics Co., Ltd (KR)

( * ) Notice: Subject to any disclaimer, the term of this patent is extended or adjusted under 35 U.S.C. 154(b) by 750 days.

(21) Appl. No.: 12/896,481

(22) Filed: Oct. 1, 2010

(65) Prior Publication Data

US 2011/0081935 A1    Apr. 7, 2011

(30) Foreign Application Priority Data

Oct. 1, 2009 (KR) .................. 10-2009-0094044
Nov. 3, 2009 (KR) .................. 10-2009-0105405
Nov. 6, 2009 (KR) .................. 10-2009-0107207
Apr. 27, 2010 (KR) .................. 10-2010-0039186
Jun. 18, 2010 (KR) .................. 10-2010-0057939
Jul. 2, 2010 (KR) .................. 10-2010-0063747

(51) Int. Cl.
*H04B 7/00* (2006.01)

(52) U.S. Cl.
USPC .......................................... 455/522; 370/318

(58) Field of Classification Search
USPC .......................................... 455/522; 370/318
See application file for complete search history.

(56) References Cited

U.S. PATENT DOCUMENTS

| 7,379,434 B2* | 5/2008 | Moulsley et al. ............. 370/318 |
| 7,561,893 B2* | 7/2009 | Moulsley et al. ............. 455/522 |
| 7,668,564 B2* | 2/2010 | Onggosanusi et al. ....... 455/522 |
| 8,520,560 B2* | 8/2013 | Papasakellariou et al. ... 370/280 |
| 2004/0229625 A1* | 11/2004 | Laroia et al. .................. 455/450 |
| 2007/0025284 A1* | 2/2007 | Pankaj et al. ................. 370/320 |
| 2007/0174885 A1* | 7/2007 | Hus et al. ...................... 725/105 |
| 2008/0039131 A1 | 2/2008 | Kaminski et al. |
| 2008/0240031 A1* | 10/2008 | Nassiri-Toussi et al. ..... 370/329 |
| 2010/0062799 A1 | 3/2010 | Ishii et al. |
| 2010/0246705 A1* | 9/2010 | Shin et al. ...................... 375/267 |
| 2011/0026420 A1* | 2/2011 | Zhang et al. .................. 370/252 |
| 2012/0106407 A1* | 5/2012 | Papasakellariou et al. ... 370/280 |

FOREIGN PATENT DOCUMENTS

| CN | 1992564 | 7/2007 |
| EP | 1 887 709 | 2/2008 |
| KR | 1020090055577 | 6/2009 |
| KR | 1020090074257 | 7/2009 |
| WO | WO 2005/079021 | 8/2005 |
| WO | WO 2008/021573 | 2/2008 |

* cited by examiner

*Primary Examiner* — Bobbak Safaipour
(74) *Attorney, Agent, or Firm* — The Farrell Law Firm, P.C.

(57) ABSTRACT

An LTE-A system and power control method for controlling cell interference based on codeword-specific transmission power adjustment with a transmission power control offset parameter. The method includes transmitting a parameter $K_S$ signaled by a higher layer and codeword-specific power control parameters from a base station to a terminal; calculating gains at the terminal, using the codeword-specific power control parameters and the parameter $K_S$; calculating, at the terminal, codeword-specific transmit powers according to the gains; and transmitting, from the terminal to the base station, at least two codewords at the codeword-specific transmit powers.

16 Claims, 15 Drawing Sheets

LTE-A SYSTEM AND UPLINK POWER CONTROL METHOD THEREOF

PRIORITY

This application claims priority under 35 U.S.C. §119(a) to Korean Patent Application Nos. 10-2009-0094044, 10-2009-0105405, 10-2009-0107207, 10-2010-0039186, 10-2010-0057939, and 10-2010-0063747, which were filed in the Korean Intellectual Property Office on Oct. 1, 2009, Nov. 3, 2009, Nov. 6, 2009, Apr. 27, 2010, Jun. 18, 2010, and Jul. 2, 2010, respectively, the disclosure of each of which is incorporated herein in its entirety by reference.

BACKGROUND OF THE INVENTION

1. Field of the Invention

The present invention relates generally to wireless communications and, in particular, to a Long Term Evolution-Advanced (LTE-A) system and power control method of the LTE-A system for controlling cell interference by adjusting transmission power per codeword with a transmission power control offset parameter.

2. Description of the Related Art

Long Term Evolution (LTE), i.e., a next generation wireless communication technology, utilizes Orthogonal Frequency Division Multiplexing (OFDM) for downlink transmission and Single Carrier-Frequency Division Multiple Access (SC-FDMA) for uplink transmission.

In OFDMA, however, Peak to Average Power Ratio (PAPR) is high, which increases a back-off value for an input signal of power amplifier to prevent non-linear distortion of the signal. Accordingly, maximum transmission power is limited as such, resulting in reduced transmission power efficiency. The back-off value limits the maximum value of the transmission power to be less than a value of the power amplifier for guaranteeing the linearity of a transmission signal. For example, if the maximum value of a power amplifier is 23 dBm and a back-off value is 3 dBm, the maximum transmission power is limited to 20 dBm.

When OFDMA is used as downlink multiplexing technology, there are no problems because the transmitter belongs to a base station having no power limit. However, if OFDMA is used as uplink multiplexing technology, because the transmitter belongs to a User Equipment (UE) that has a very limited in transmission power, the coverage of the base station reduces due to the limit of maximum transmission power of the UE. Therefore, in order to increase uplink coverage, SC-FDMA has been adopted for uplink multiplexing technology of LTE as the $4^{th}$ generation wireless communication standard of $3^{rd}$ Generation Partnership Project (3GPP).

With of the increase use of multimedia services in the wireless communication environment, many researchers are focusing on techniques for achieving high speed transmission. For example, Multiple Input Multiple Output (MIMO) is one of the key techniques for increasing spectral efficiency and link reliability for high speed transmission.

MIMO technology uses multiple antennas to increase channel capacity in a limited frequency resource. Logically, the channel capacity of MIMO increases in proportion to the number of antennas being used. In order to transmit data efficiently in a MIMO system, the data is encoded in advance, which is commonly referred to as "precoding". The data precoding rule can be expressed by a precoding matrix, and a set of precoding matrices is commonly referred to as a "codebook".

In LTE-A, a MIMO technique using a precoding matrix is recommended as an uplink transmission technology for improving system performance in multiuser environment as well as single-user environment.

In LTE uplink, event-triggered power control is used for Physical Uplink Shared Channel (PUSCH). In PUSCH, Transmit periodic Power Control (TPC) feedback is not required. PUSCH transmission power at subframe i $P_{PUSCH}$(i) can be expressed as shown in Equation (1).

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\}[dBm] \quad (1)$$

In Equation (1), $P_{CMAX}$ denotes a maximum transmission power according to the UE power class, and $M_{PUSCH}(i)$ denotes a number of Resource Blocks (RBs) as the PUSCH resource assigned in the subframe i. The transmission power of the UE increases in proportion to $M_{PUSCH}(i)$. PL denotes downlink path-loss measured at the UE, and $\alpha(j)$ denotes a scaling factor, which is determined at higher layers in consideration of a difference between uplink and downlink channels established by a cell formation. $P_{O\_PUSCH}(j)$ can be expressed as shown in Equation (2).

$$P_{O\_PUSCH}(j) = P_{O\_NOMINAL\_PUSCH}(j) + P_{O\_UE\_PUSCH}(j) \quad (2)$$

In Equation (2), $P_{O\_NOMINAL\_PUSCH}(j)$ denotes a cell-specific parameter signaled by a higher layer, and $P_{O\_UE\_PUSCH}(i)$ denotes a UE-specific parameter transmitted through Radio Resource Control (RRC) signaling. A Modulation and Coding Scheme (MCS) or Transport Format (TF) compensation parameter $\Delta_{TF}(i)$ can be defined as shown in Equation (3).

$$\Delta_{TF}(i) = \begin{cases} 10\log_{10}(2^{MPR(i) \cdot K_S} - 1) & \text{for } K_S = 1.25 \\ 0 & \text{for } K_S = 0 \end{cases} \quad (3)$$

In Equation (3), $K_S$ is a cell-specific parameter transmitted through RRC signaling.

MPR(i) is calculated by Equation (4).

$$MPR(i) = \frac{TBS(i)}{M_{PUSCH}(i) \cdot N_{SC}^{RB} \cdot 2N_{Symb}^{UL}} \quad (4)$$

In Equation (4), TBS(i) is a transport block size of subframe i, and $M_{PUSCH}(i) \cdot N_{SC}^{RB} \cdot 2N_{Symb}^{UL}$ denotes a number of Resource Elements (REs) within the subframe. MPR(i), which is calculated by Equation (4) indicates a number of information bits per RE.

If $K_S=0$ and MPR(i)=0, then the uplink channels are not compensated for MCS.

If $K_S=1.25$, only 80%

$$\left(\frac{1}{K_S} = 0.8\right)$$

of the uplink channels are compensated for MCS.

The current PUSCH power control adjustment state is given by f(i), which is defined by equation (5).

$$f(i) = f(i-1) + \delta_{PUSCH}(i - K_{PUSCH}) \quad (5)$$

In Equation (5), $\delta_{PUSCH}$ is a UE-specific parameter included in a Physical Downlink Control Channel (PDCCH) transmitted from the base station to the UE and can be a TPC value, and $K_{PUSCH}$ in $\delta_{PUSCH}(i-K_{PUSCH})$ denotes a time interval between receiving $\delta_{PUSCH}$ value and using it in the transmission subframe.

The $\delta_{PUSCH}$ dB accumulated values signaled on PDCCH with DCI format 0 are [−1, 0, 1, 3]. The $\delta_{PUSCH}$ dB accumulated values signaled on PDCCH with DCI format 3/3A are [−1, 1] or [−1, 0, 1, 3].

Rather than $\delta_{PUSCH}$ accumulated values as shown in Equation (5), $\delta_{PUSCH}$ dB absolute values can be used as shown in Equation (6).

$$f(i)=\delta_{PUSCH}(i-K_{PUSCH}) \quad (6)$$

In Equation (6), the $\delta_{PUSCH}$ dB absolute values signaled on PDCCH with DCI format 0 are [−4, −1, 1, 4].

FIG. 1 is a flowchart illustrating a base station-assisted UE power control process in a conventional LTE system.

Referring to FIG. 1, the base station determines whether to use PDCCH or RRC signaling to transmit power control parameters to the UE in step 101.

If PDCCH is selected (e.g., $\delta_{PUSCH}$), the base station sends the power control parameters to the UE on PDCCH in step 102. However, if RRC signaling is selected ($K_S$), the base station sends the power control parameters using RRC signaling in step 103.

In step 104, the base station measures Signal-to-Interference plus Noise Ratio (SINR) using Sounding Reference Signal (SRS) transmitted by the UE.

In step 105, the base station updates the power control parameters in consideration of the received signal strength and the interference of the signal, which is transmitted by the UE, to neighbor cells. The updated parameters are transmitted to the UE on the channel determined in step 101.

In the LTE-A system, two codewords are transmitted on the PUSCH with MIMO. Accordingly, applying the convention power control method designed for the LTE uplink using a single antenna and single codeword to the LTE-A system increases cell interference due to the excessive transmission power of the UE and early transmission power shortage.

SUMMARY OF THE INVENTION

Accordingly, the present invention is designed to solve at least the above-described problems of the prior art, and to provide at least the advantages described below.

An aspect of the present invention is to provide an uplink power control method for a UE with multiple transmit antennas assigned individual codewords in an LTE-A system that is capable of reducing cell interference by controlling transmission powers per codeword.

Another aspect of the present invention is to provide an uplink power control method for a UE with multiple transmit antennas identified by individual codewords in an LTE-A system, which prevents a cell interference increases when using multiple transmit antennas, by using transmit power control offset parameters that increase transmit power for respective codewords.

In accordance with an aspect of the present invention, a method for controlling transmit power of a user terminal communicating with a base station using at least two codewords in a wireless communication is provided. The method includes transmitting a parameter $K_S$ signaled by a higher layer and codeword-specific power control parameters from the base station to the terminal; calculating, at the terminal, gains using the power control parameters and the parameter $K_S$; calculating, at the terminal, codeword-specific transmit powers according to the gains; and transmitting at least two codewords at the codeword-specific transmit powers from the terminal to the base station.

In accordance with another aspect of the present invention, a transmit power control system is provided which includes a base station that transmits a cell-specific parameter $K_S$ given by a higher layer and codeword-specific power control parameters; and a terminal that receives the cell-specific parameter $K_S$, calculates gains using the power control parameters and the parameter $K_S$, and transmits at least two codewords at codeword-specific transmit powers calculated with the gains to the base station.

BRIEF DESCRIPTION OF THE DRAWINGS

The above and other aspects, features, and advantages of the present invention will be more apparent from the following detailed description in conjunction with the accompanying drawings, in which.

DETAILED DESCRIPTION OF EMBODIMENTS OF THE INVENTION

Various embodiments of the present invention are described in detail below with reference to the accompanying drawings. The same reference numbers are used throughout the drawings to refer to the same or like parts. Additionally, detailed descriptions of well-known functions and structures incorporated herein may be omitted to avoid obscuring the subject matter of the present invention.

The following terms are defined in consideration of the functionality of the embodiments of the present invention, and may vary according to intentions of a user or an operator or according to usual practice. Therefore, the definitions of the terms must be interpreted based on the entire content of the present specification.

In the embodiments of the invention described herein, descriptions are directed to OFDM-based wireless communication systems, especially, 3GPP EUTRA (or LTE) or Advanced E-UTRA (or LTE-A) systems, however, it is obvious to those skilled in the art that various changes may be made without departing from the scope of the present invention.

In accordance with an embodiment of the present invention, an uplink power control method for an LTE-A system is provided, in which a UE performs transmission with two transmit antennas assigned different CodeWords (CWs), i.e., CW#1 and CW#2, and power control is performed for each codeword.

The base station sends the UE the uplink power control parameters and Transport Block Size (TBS) information and $K_S$ values for the two codewords CW#1 and CW#2. The power control method for the CW#1 and CW#2 is determined according to whether $K_S=1.25$ or $K_S=0$. In accordance with an embodiment of the present invention, selective combination is possible to the total transmit power, when $K_S=0$ and $K_S=1.25$.

A description will now be provided below of the power control method of the transmitter of a UE, when $K_S=1.25$.

Figure 1:
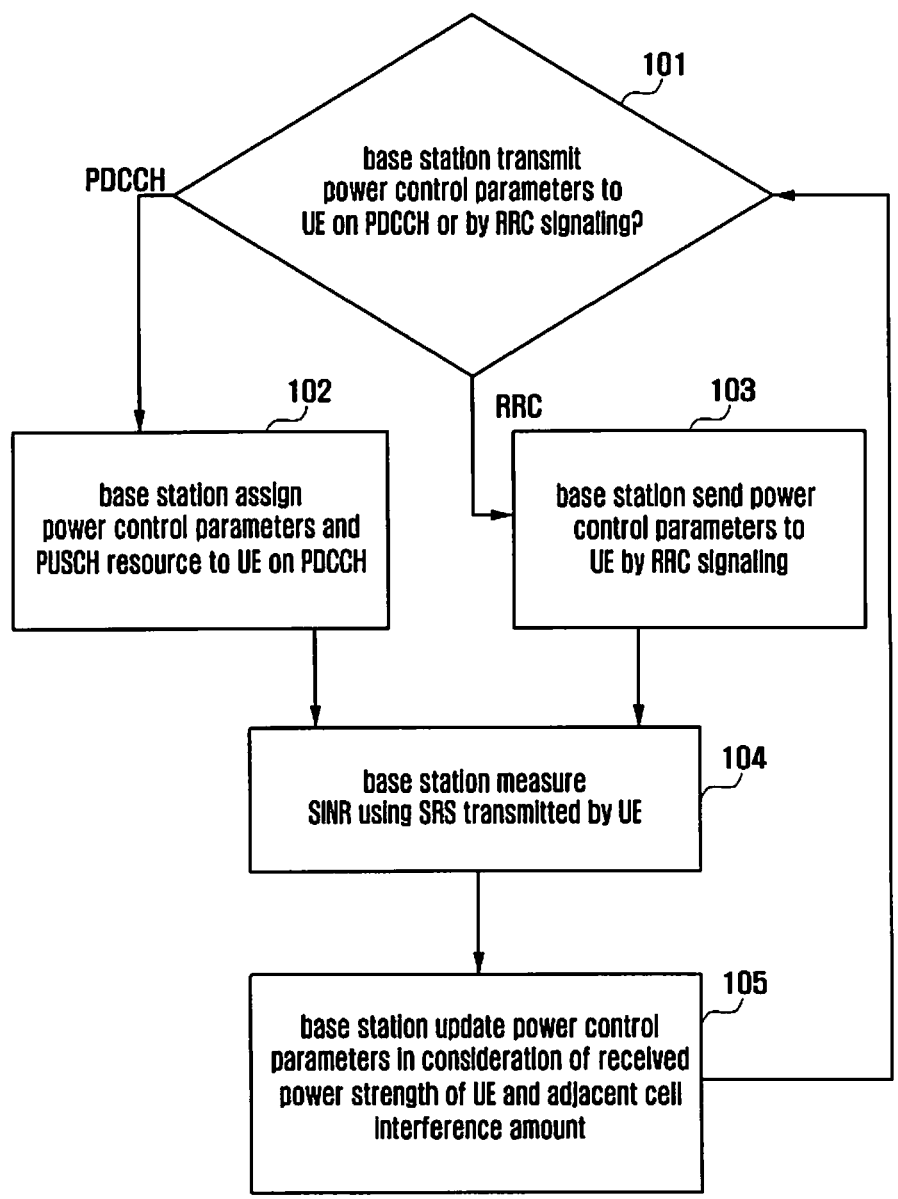
FIG. 1 is a flowchart illustrating a base station-assisted UE power control process in a conventional LTE system.
Figure 2:
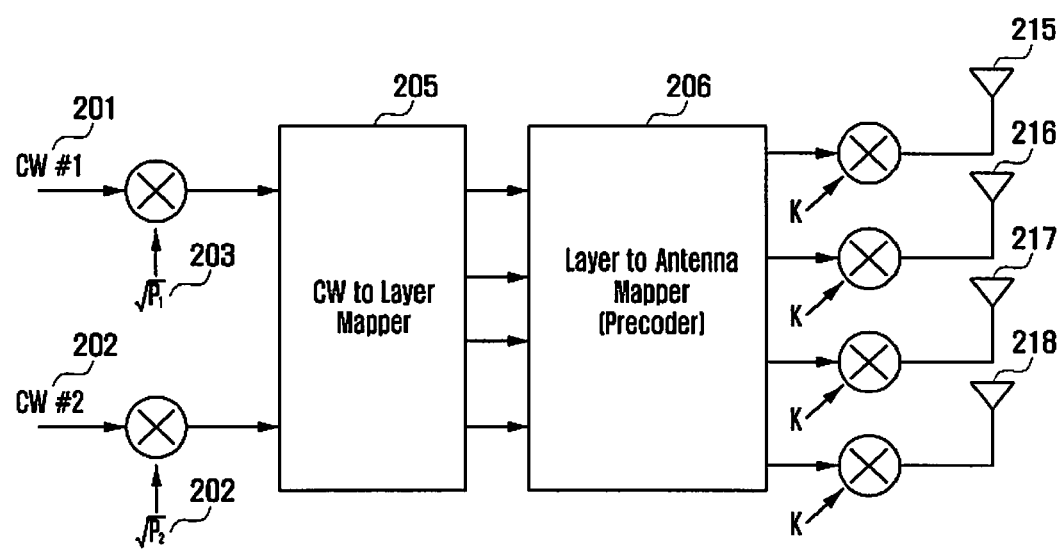
FIG. 2 illustrates a transmitter of a UE according to an embodiment of the present invention.

FIG. 2 illustrates a transmitter of a UE according to an embodiment of the present invention. Specifically, the transmitter of a UE in FIG. 2 controls transmit powers associated with CW#1 and CW#2 using the power control parameters transmitted by the base station.

Referring to FIG. 2, the codewords CW#1 201 and CW#2 202 are multiplied by respective gains $\sqrt{P_1}$ 203 and $\sqrt{P_2}$ 204 and then mapped to different layers by a CW to layer mapper 205. The layer-mapped CW#1 and CW#2 201 and 202 are then mapped to transmit antennas by a layer to antenna mapper 206.

In FIG. 2, assuming the value multiplied to the Power Amplifier (PA) of each antenna is K, K is defined by $$K = \sqrt{\frac{P_{total}}{N}},$$

where $P_{total}$ denotes total transmit power of the UE and N denotes a number of antennas. The transmit powers of the CW#1 201 and CW#2 202 can be adjusted with $\sqrt{P_1}$ 203 and $\sqrt{P_2}$ 204.

Figure 3:
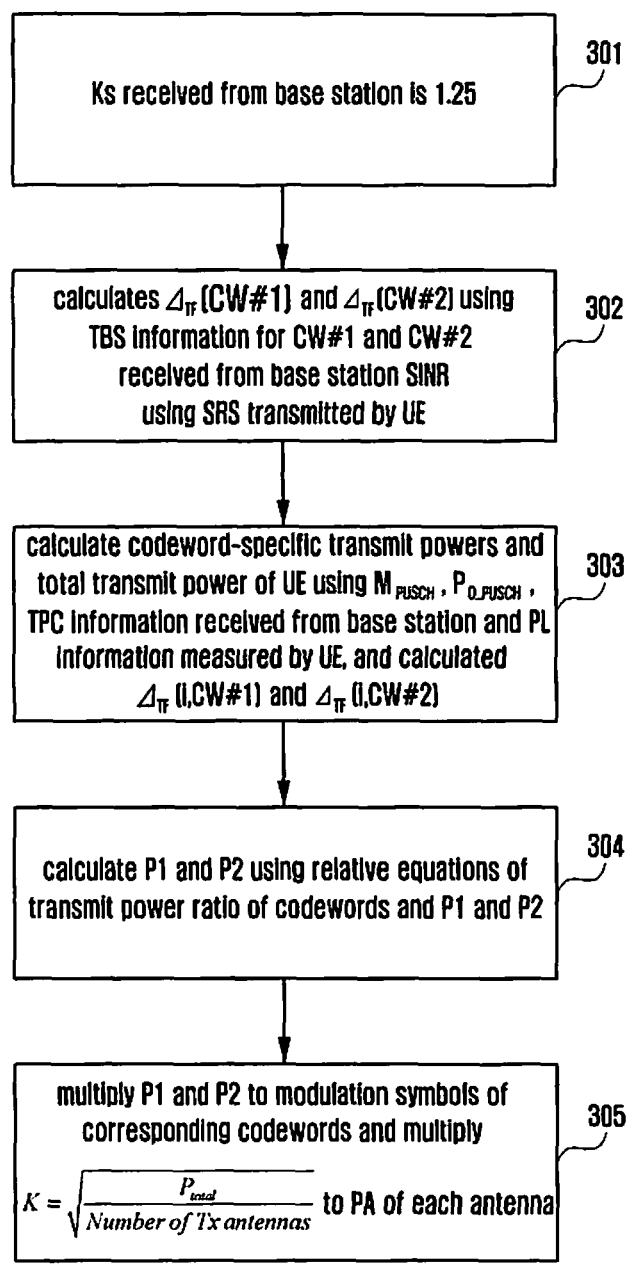
FIG. 3 is a flowchart illustrating a transmit power calculation process according to an embodiment of the present invention.

FIG. 3 is a flowchart illustrating a transmit power calculation process according to an embodiment of the present invention.

Referring to FIG. 3, the UE receives $K_S=1.25$ from the base station in step 301. If $K_S=1.25$, in step 302, the UE calculates $\Delta_{TF}(i,CW\#1)$ and $\Delta_{TF}(i,CW\#2)$ using TBS information of individual CW#1 201 and CW#2 202 according to Equation (7).

$$\Delta_{TF}(i,CW\#1)=\{10\log_{10}(2^{MPR(i,CW\#1)\cdot K_S}-1), K_S=1.25$$
for CW#1

$$\Delta_{TF}(i,CW\#2)=\{10\log_{10}(2^{MPR(i,CW\#2)\cdot K_S}-1), K_S=1.25$$
for CW#2 \hfill (7)

In step 303, the UE calculates transmit powers of each of CW#1 201 and CW#2 202 using the power control parameters (e.g., $M_{PUSCH}, P_{O\_PUSCH}, \alpha, \delta_{PUSCH}$ transmitted by the base station, PL measured by the UE, and $\Delta_{TF}(i,CW\#1)$ and $\Delta_{TF}(i,CW\#2)$, according to Equation (8).

$$P_{dBm,total}(i,CW\#1)=10\log_{10}(M_{PUSCH}(i))+P_{O\_PUSCH}(j)+\alpha(j)\cdot PL+f(i)+\Delta_{TF}(i,CW\#1)[dBm]$$

$$P_{dBm,total}(i,CW\#2)=10\log_{10}(M_{PUSCH}(i))+P_{O\_PUSCH}(j)+\alpha(j)\cdot PL+f(i)+\Delta_{TF}(i,CW\#2)[dBm] \hfill (8)$$

The transmit power $P_{dBm,total}(i,CW\#1)$ of CW#1, which is calculated by Equation (8), is compared with the maximum transmit power $P_{CMAX}(CW\#1)$ of CW#1 in Equation (1), so as to transmit the lower of the two values. Also, the transmit power $P_{dBm,total}(i,CW\#2)$ of CW#2, which is calculated by Equation (8), is compared with the maximum transmit power $P_{CMAX}(CW\#2)$ of CW#2 in Equation (1), so as to transmit the lower of the two values. Here, $P_{CMAX}$ is the maximum transmission power according to the UE power class.

Also in step 303, the UE calculates the total transmit power according to Equation (9).

$$P_{dBm,total}(i)=P_{dBm,total}(i,CW\#1)+P_{dBm,total}(CW\#2) [dBm] \hfill (9)$$

The UE compares total transmit power $P_{dBm,total}(i)$ calculated by Equation (9) with the maximum transmit power $P_{dBm,total}(i)$, according to the class of the UE, in Equation (1), in order to transmit the lower of the two values.

This codeword-specific transmit power and total transmit power transmission method can be applied to all the embodiments of the present invention described herein. That is, the CW#1 transmit power $P_{dBm,total}(i,CW\#1)$ is compared with the maximum transmit power $P_{CMAX}(CW\#1)$ of CW#1 in Equation (1), in order to transmit the lower of the two. Also, the CW#2 transmit power $P_{dBm,total}(i,CW\#2)$ is compared with the maximum transmit power $P_{CMAX}(CW\#2)$ of CW#1 in Equation (1), in order to transmit the lower of the two. The transmit power $P_{dBm,total}(i)$ is compared to the maximum transmit power $P_{CMAX}$ in Equation (1) so as to transmit the lower of the two values.

The transmit powers of CW#1 201 and CW#2 202 and the maximum transmit power of the UE can be expressed as shown in Equation (10).

$$P_{total}(CW\#1) = 10^{\left(\frac{P_{dBm,total}(CW\#1)}{10}\right)}$$

$$P_{total}(CW\#2) = 10^{\left(\frac{P_{dBm,total}(CW\#2)}{10}\right)}$$

$$P_{total} = 10^{\left(\frac{P_{dBm,total}}{10}\right)} \hfill (10)$$

The same transmit power is output at each of the individual antennas 215, 216, 217, and 218 of FIG. 2.

In order to adjust the transmit powers of CW#1 201 and CW#2 202 differently, different gains are multiplied to the CW#1 and CW#2 signals.

More specifically, as illustrated in FIG. 2, CW#1 201 is multiplied by gain $\sqrt{p_1}$ 203 and CW#2 202 is multiplied by gain $\sqrt{p_2}$.

In order to acquire $\sqrt{p_1}$ 203 and $\sqrt{p_2}$ 204 in step 304, Equation (11) is used.

$$\frac{P_1}{P_2} = \frac{P_{total}(CW\#1)}{P_{total}(CW\#2)} \quad (11)$$

In Equation (11), when $P_1+P_2=2$, if two codewords are transmitted, the transmit power of the UE increases twice. When the sum of the transmit powers of two codewords is to be equal to the transmit power of a single codeword, the UE redefines $P_1+P_2=2$ as $P_1+P_2=1$. Further, the UE can derive $\sqrt{p_1}$ 203 and $\sqrt{p_2}$ 204 with the redefined $P_1+P_2=1$.

After acquiring $\sqrt{p_1}$ 203 and $\sqrt{p_2}$ 204, in step 305, the UE multiplies the $\sqrt{p_1}$ 203 and $\sqrt{p_2}$ 204 to CW#1 201 and CW#2 202, respectively.

As described with reference to FIG. 2, assuming the value multiplied to the PA of each antenna is K, K is defined by $$K = \sqrt{\frac{P_{total}}{N}}$$

where N denotes a number of antennas, e.g., four antennas 215, 216, 217, and 218, as illustrated in FIG. 2.

Figure 4:
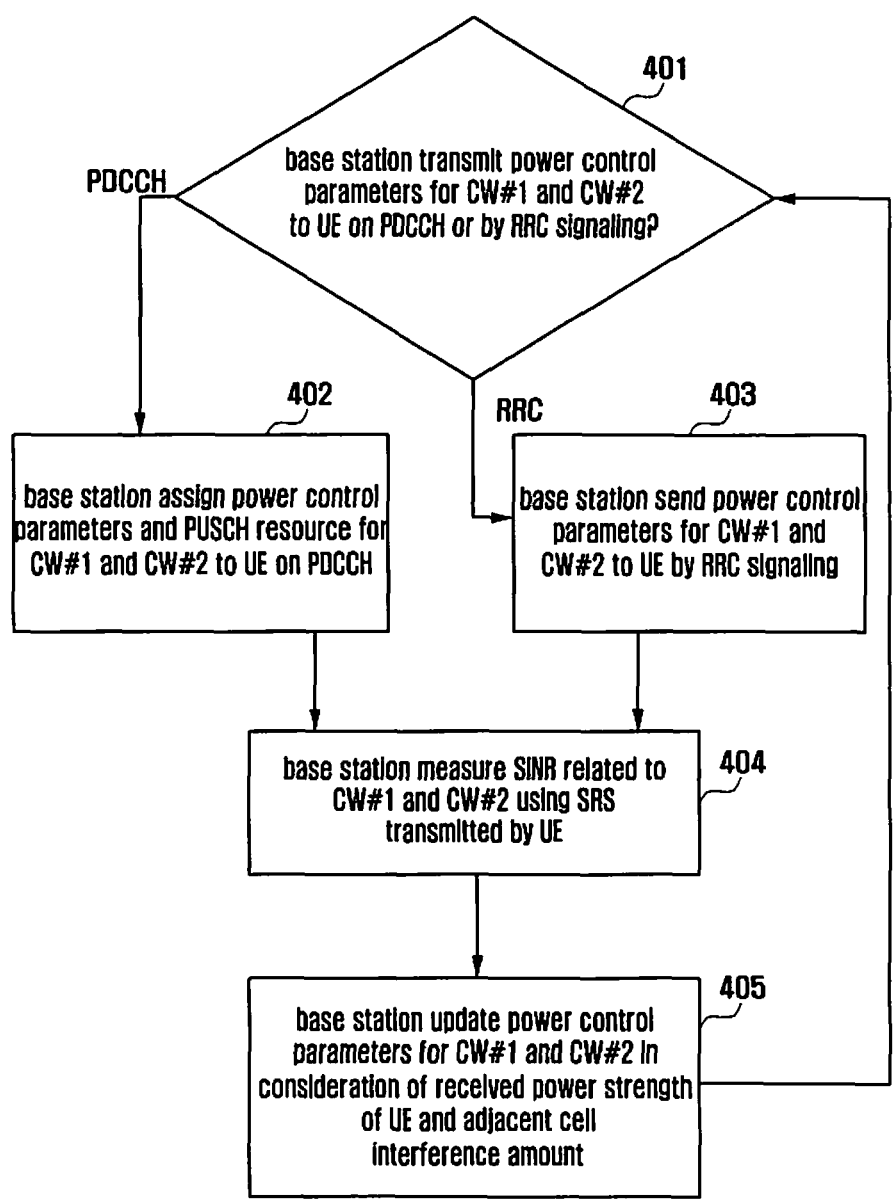
FIG. 4 is a flowchart illustrating a UE-transmit power control method of a base station in an LTE-A system according to an embodiment of the present invention.

FIG. 4 is a flowchart illustrating a UE-transmit power control method of a base station in an LTE-A system according to an embodiment of the present invention.

Referring to FIG. 4, in step 401, the base station determines whether to use PDCCH or RRC signaling on a PDSCH to transmit power control parameters related to CW#1 201 and CW#2 202 to the UE. If PDCCH is selected, the base station transmits the parameters on the PDCCH with assignment of PUSCH resource in step 402. Otherwise, if RRC signaling on the PDSCH is selected, the base station transmits the power control parameters (e.g., $K_S$) to the UE using RRC signaling in step 403.

In step 404, the base station measures the received signal strength to the CW#1 202 and CW#2 202 using an SRS transmitted by the UE. In step 405, the base station updates the power control parameters associated with CW#1 201 and CW#2 202 in consideration of the received signal strength and the cell interference amount of the signal transmitted by the UE to the neighbor cells. Thereafter, the updated parameters are transmitted to the UE on the channel that was determined in step 401.

If $K_S=1.25$, the transmit power levels are increased to use CW#1 and CW#2, resulting in interference with neighbor cells. In order to control the interference, the transmit power is reduced using an offset parameter $\lambda$ that is commonly applied to the two codewords. $\lambda$ also can be used to increase the transmit power level of the UE.

Figure 5:
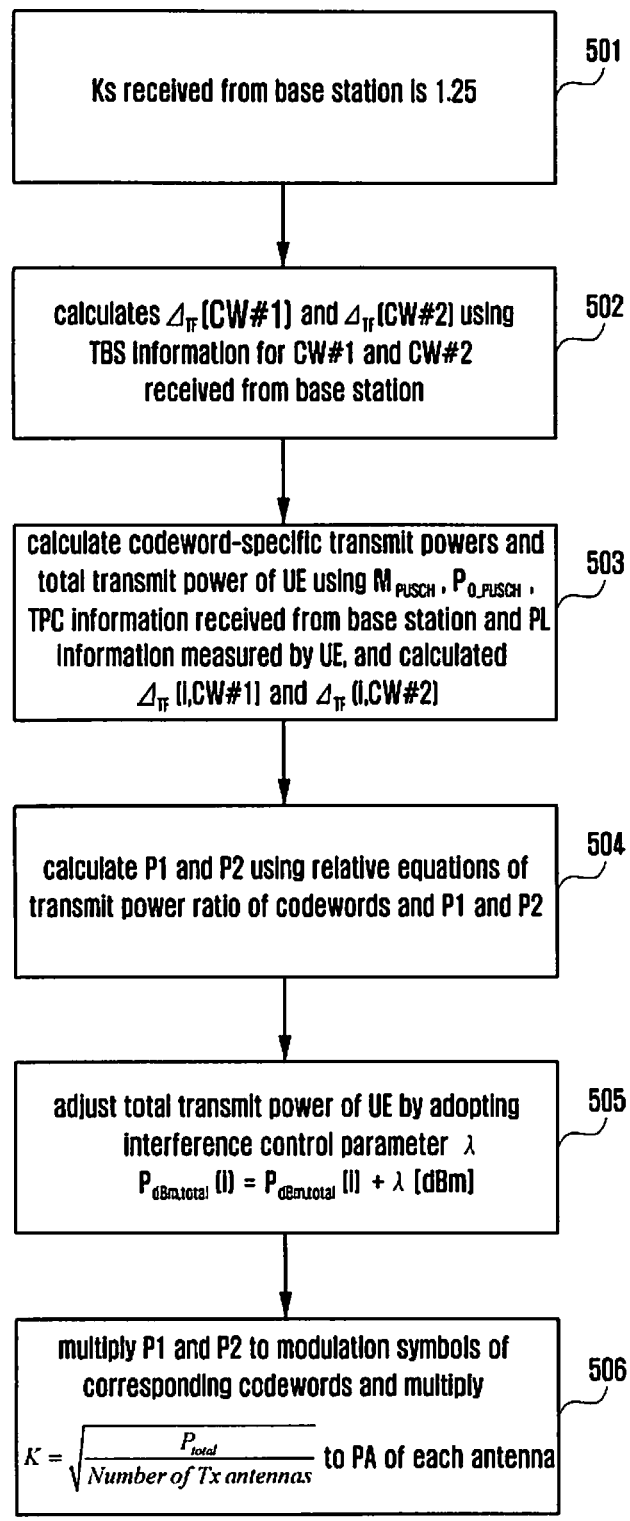
FIG. 5 is a flowchart illustrating a transmit power calculation process according to an second embodiment of the present invention.

FIG. 5 is a flowchart illustrating a transmit power calculation process according to an embodiment of the present invention.

Steps 501 to 504 of FIG. 5 are identical with steps 301 to 304 of FIG. 3. Accordingly, a repetitive description of these steps will be omitted herein.

In step 505, the UE readjusts the total transmit power $P_{dBm,total}(i)$ using $\lambda$, as given by Equation (12).

$$P_{dBm,total}(i) = P_{dBm,total}(i) + \lambda[\text{dBm}] \quad (12)$$

More specifically, after $\sqrt{p_1}$ 203 and $\sqrt{p_2}$ 204 are acquired using Equation (11) in step 504, the UE readjusts the total transmit power $P_{dBm,total}(i)$ using $\lambda$, as given by Equation (12).

In step 506, the UE multiplies $\sqrt{p_1}$ and $\sqrt{p_2}$ to CW#1 and CW#2, respectively, and multiplies the transmit power $$K = \sqrt{\frac{P_{total}}{N}}$$

to PAs of the corresponding antennas as illustrated in FIG. 2.

Figure 6:
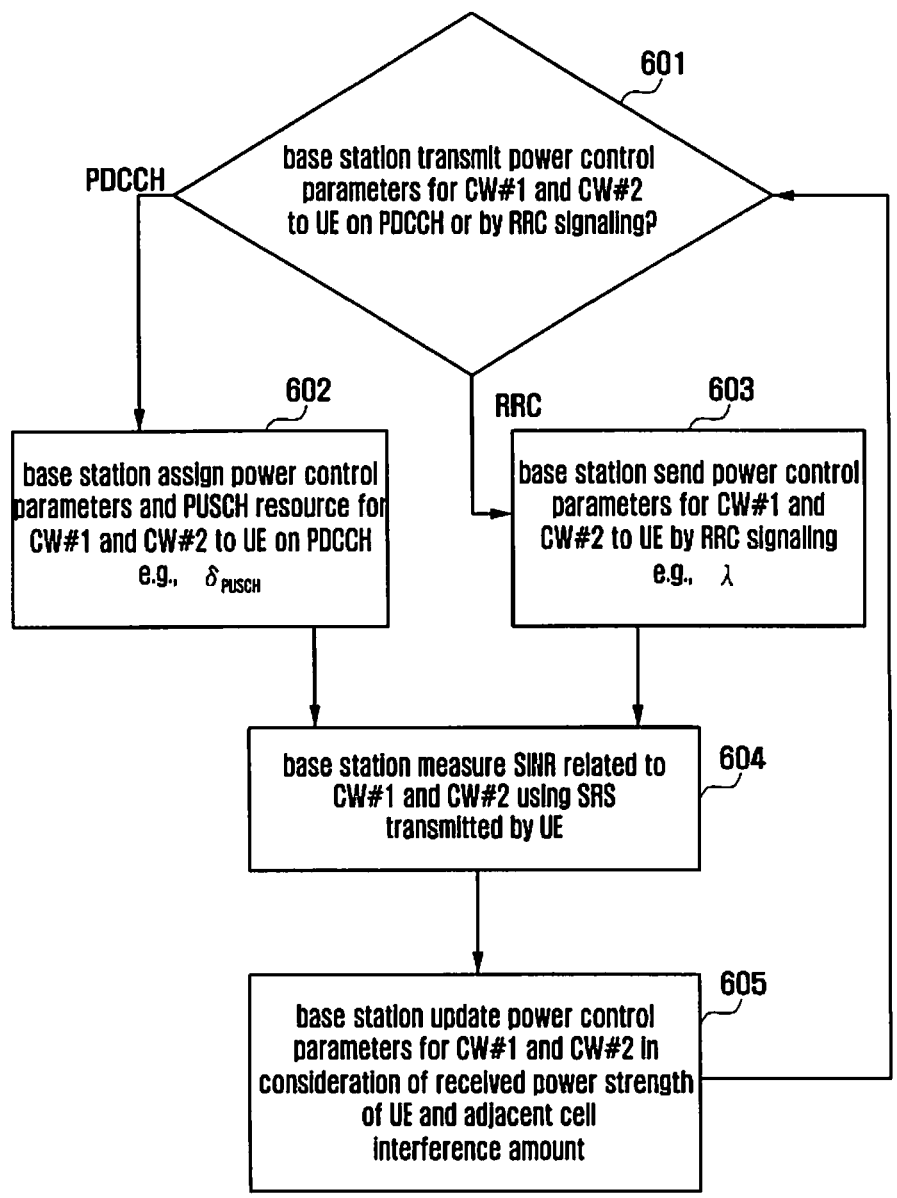
FIG. 6 is a flowchart illustrating a UE-transmit power control method of a base station in an LTE-A system according to an embodiment of the present invention.

FIG. 6 is a flowchart illustrating a UE-transmit power control method of a base station in an LTE-A system according to an embodiment of the present invention.

Referring to FIG. 6, in step 601, the base station determines whether to use PDCCH or RRC signaling on PDSCH to transmit power control parameters for CW#1 201 and CW#2 202 to the UE.

If PDCCH is selected, the base station sends the power control parameters (e.g., $\delta_{PUSCH}$) on the PDCCH in step 602. Otherwise, if RRC signaling is selected, the base station sends the UE the power control parameters (e.g., $\lambda$) through RRC signaling in step 603. $\lambda$ varies in semi-static manner, while $\delta_{PUSCH}$ varies dynamically.

Steps 604 and 605 of FIG. 6 are identical with steps 404 and 405 of FIG. 4. Accordingly, a repetitive description of these steps will be omitted herein.

Figure 7:
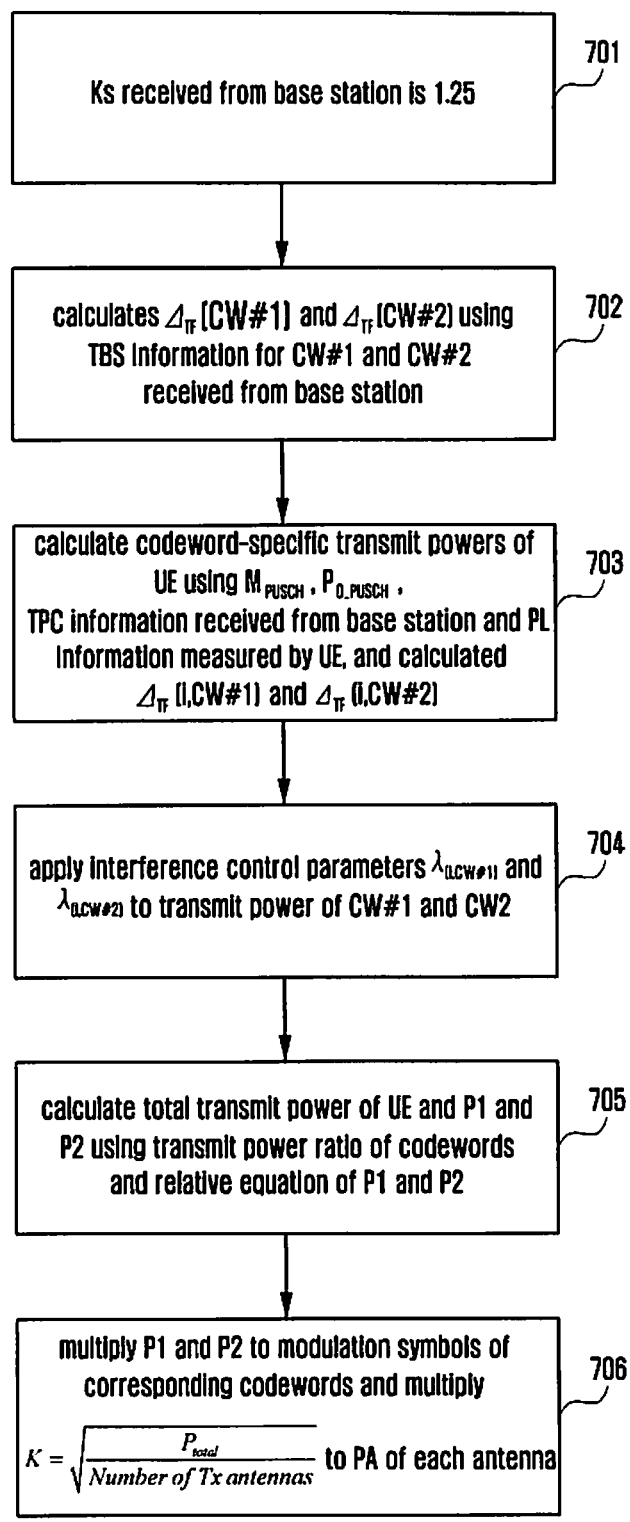
FIG. 7 is a flowchart illustrating a transmit power calculation process according to an embodiment of the present invention.

FIG. 7 is a flowchart illustrating a transmit power calculation process according to an embodiment of the present invention.

Steps 701, 702, and 703 of FIG. 7 are identical with steps 301, 302, and 303 of FIG. 3, except that the total transmission power is calculated at step 705 of FIG. 7, instead of in 703, like step 303 of FIG. 3.

Referring to FIG. 7, the base station calculates the transmit powers of codewords CW#1 201 and CW#2 202 in step 703, and reduces the transmit power levels of CW#1 201 and CW#2 202 in step 704, using $\lambda_{CW\#1}$ and $\lambda_{CW\#2}$, as given by Equation (13). Of course, $\lambda_{CW\#1}$ and $\lambda_{CW\#2}$ also can be used to increase the transmit power levels of CW#1 201 and CW#2 202.

$$P_{dBm,total}(i,CW\#1) = 10\log_{10}(M_{PUSCH}(i)) + P_{O\_PUSCH}(j) + \alpha(j) \cdot PL + f(i) + \Delta_{TF}(i) + \lambda_{CW\#1}[\text{dBm}]$$

$$P_{dBm,total}(i,CW\#2) = 10\log_{10}(M_{PUSCH}(i)) + P_{O\_PUSCH}(j) + \alpha(j) \cdot PL + f(i) + \Delta_{TF}(i) + \lambda_{CW\#2}[\text{dBm}] \quad (13)$$

Steps 705 and 706 of FIG. 7 are identical with steps 304 and 305 of FIG. 3. Accordingly, a repetitive description of these steps will be omitted herein.

As described above, if $K_S=1.25$, the transmit power levels are increased to use CW#1 and CW#2, resulting in interference to neighbor cells. In order to control the interference, a method is provided that adjusts the range of a TPC parameter $\delta_{PUSCH}$ when using at least two codewords and calculates transmit powers according to the MCS of each the at least two codewords.

In the current LTE standard, one CW is used for the PUSCH, and the $\delta_{PUSCH}$ accumulated values are {-1, 0, +1, +3}[dBm]. When using two CWs, the increase of transmit power is likely to excessively increase the cell interference. In order to control the cell interference, the $\delta_{PUSCH}$ accumulated values can be redefined as {-1, 0, +1, +3}[dBm].

By using the redefined $\delta_{PUSCH}$ accumulated value -3, it is possible to quickly reduce the amount of interference. For the same reason, when using two CWs, the $\delta_{PUSCH}$ accumulated values can be redefined as {-6, -3, 0, +3}[dBm].

A description will be made of the power control method below, with $K_S=0$.

Figure 8:
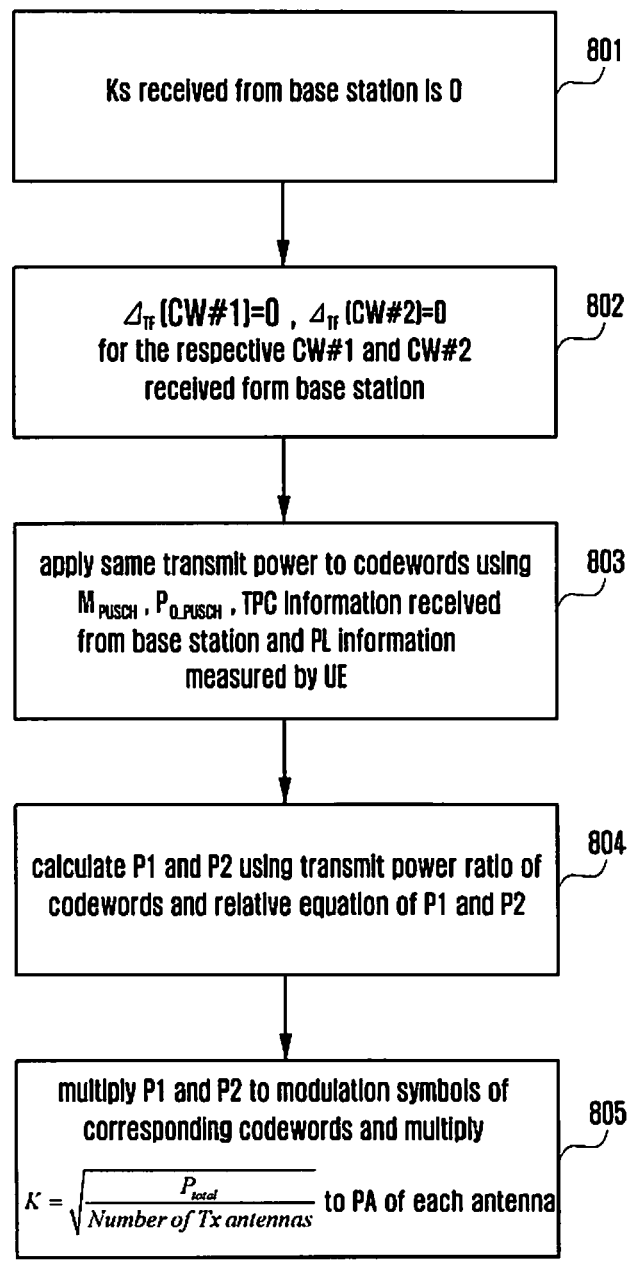
FIG. 8 is a flowchart illustrating a transmit power calculation process according to an embodiment of the present invention.

FIG. 8 is a flowchart illustrating a transmit power calculation process according to an embodiment of the present invention.

Referring to FIG. 8, if $K_S=0$, the UE acquires $\Delta_{TF}(CW\#1)=0$, $\Delta_{TF}(CW\#2)=0$ from the respective CW#1 201 and CW#2 202 received from the base station using Equation (7) in steps 801 and 802.

In step 803, the UE calculates the transmit powers of CW#1 201 and CW#2 202 using the power control parameters (e.g., $M_{PUSCH}, P_{O\_PUSCH}, \alpha, \delta_{PUSCH}$ received from the base station and PL measured by the UE, as given by Equation (8).

Here, the transmit power levels of CW#1 201 and CW#2 202 are equal to each other. The total transmit power of the UE can be expressed as given by Equation (9).

Also, the transmit powers of CW#1 201 and CW#2 202 and the total transmit power of the UE can be expressed as given by Equation (10).

Because the individual antennas output the same transmit power levels, in order to differently adjust the CW#1 201 and CW#2 202, the UE multiplies different gains to each of CW#1 201 and CW#2 202. That is, $\sqrt{p_1}$ 203 is multiplied to CW#1 201, and $\sqrt{p_2}$ is multiplied to CW#2 202, as illustrated in FIG. 2.

The UE can define a sum of the transmit powers as $P_1+P_2=1$ in Equation (11), and derives $\sqrt{p_1}$ 203 and $\sqrt{p_2}$ 204. This is, if $K_S=0$, the sum of the transmit powers of CW#1 201 and CW#2 202 is made to be equal to the transmit power when using a single codeword, rather than increase the transmit powers of CW#1 201 and CW#2 202. Accordingly, the UE assigns $p_1=0.5$ and $p_2=0.5$ for respective codewords.

If $K_S=0$, in order to make the sum of the transmit powers of CW#1 201 and CW#2 202 equal to the transmit power for transmitting with a single codeword, the transmit powers of CW#1 201 and CW#2 202 can be calculated equally as given by Equation (14). Additionally, the total transmit power of the UE can be expressed as given by Equation (15), such that the sum of the transmit powers for CW#1 201 and CW#2 202 becomes equal to the power required for transmission with a single codeword, as given by Equation (16).

$$P_{dBm,total}(i, CW\#1) = P_{dBm,total}(i, CW\#2)[dBm] \quad (14)$$

$$P_{dBm,total}(i) = P_{dBm,total}(i, CW\#1) + P_{dBm,total}(i, CW\#2)[dBm] \quad (15)$$

$$P_{dBm,total}(i) = \quad (16)$$
$$P_{dBm,total}(i, CW\#1) = P_{dBm,total}(i, CW\#2) = \min\{P_{CMAX},$$
$$10\log_{10}(M_{PUSCH}(i)) + P_{0\_PUSCH}(i) + \alpha(j)\cdot PL + f(i)\}[dBm]$$

$$P_{dBm,total}(i, CW\#1) = P_{dBm,total}(i) - 3[dBm] \quad (17)$$
$$P_{dBm,total}(i, CW\#2) = P_{dBm,total}(i) - 3[dBm]$$

$$P_{total}(i) = 10 \wedge \left\{\frac{P_{dBm,total}(i)}{10}\right\} \quad (18)$$

$$P_{total}(i, CW\#1) = 0.5 \times 10 \wedge \left\{\frac{P_{dBm,total}(i)}{10}\right\}$$

$$P_{total}(i, CW\#2) = 0.5 \times 10 \wedge \left\{\frac{P_{dBm,total}(i)}{10}\right\}$$

Equation (17) gives the transmit powers of CW#1 and CW#2 in units [dBm], and Equation (18) expresses Equations (16) and (17) in other ways. Accordingly, the transmit powers $P_1$ and $P_2$ of CW#1 and CW#2 can be expressed by final transmit power equations.

However, in order to derive $\sqrt{p_1}$ 203 and $\sqrt{p_2}$ 204 in step 804, the UE can define the transmit powers with $P_1+P_2=2$ as given by Equation (11), such that the transmit power increases in proportion to the number of codewords.

Once $\sqrt{p_1}$ 203 and $\sqrt{p_2}$ 204 are acquired, the UE multiplies $\sqrt{p_1}$ 203 and $\sqrt{p_2}$ 204 to CW#1 201 and CW#2 202 (see FIG. 2) in step 805. Assuming that the value multiplied to the PA of each antenna is K, K can be expressed as $$K = \sqrt{\frac{P_{total}}{N}},$$

where N denotes the number of antennas.

Figure 9:
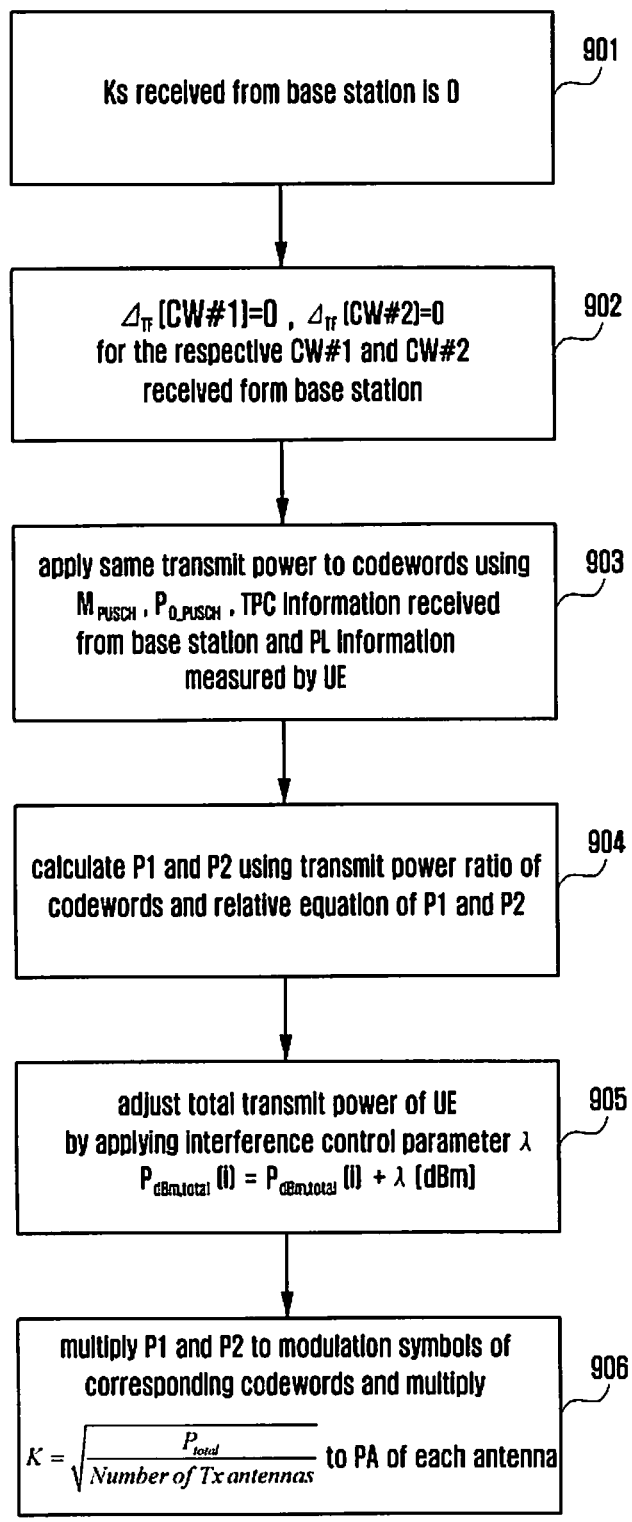
FIG. 9 is a flowchart illustrating a transmit power calculation process according to an embodiment of the present invention.

FIG. 9 is a flowchart illustrating a transmit power calculation process according to an embodiment of the present invention.

Even when $K_S=0$, the cell interference amount varies transmit powers of the two CWs at the UE. In order to control the interference amount, in accordance with an embodiment of the present invention, an offset parameter $\lambda$ is commonly applied to all the codewords. $\lambda$ also can be used to increase the transmit power level of the UE.

Steps 901 to 904 of FIG. 9 are identical with steps 801 to 804 of FIG. 8. Accordingly, a repetitive description of these steps will be omitted herein.

Referring to FIG. 9, the terminal readjusts the total transmit power $P_{dBm,total}(i)=P_{dBm,total}(i)+\lambda[dBm]$ using $\lambda$, as given by Equation (12) in step 905.

After $\sqrt{p_1}$ 203 and $\sqrt{p_2}$ 204 are derived in step 906, the UE multiplies $\sqrt{p_1}$ 203 and $\sqrt{p_2}$ 204 to CW#1 201 and CW#2 202. As described with reference to FIG. 2, the value multiplied to the PA of each antenna is K, K is defined by $$K = \sqrt{\frac{P_{total}}{N}}.$$

Figure 10:
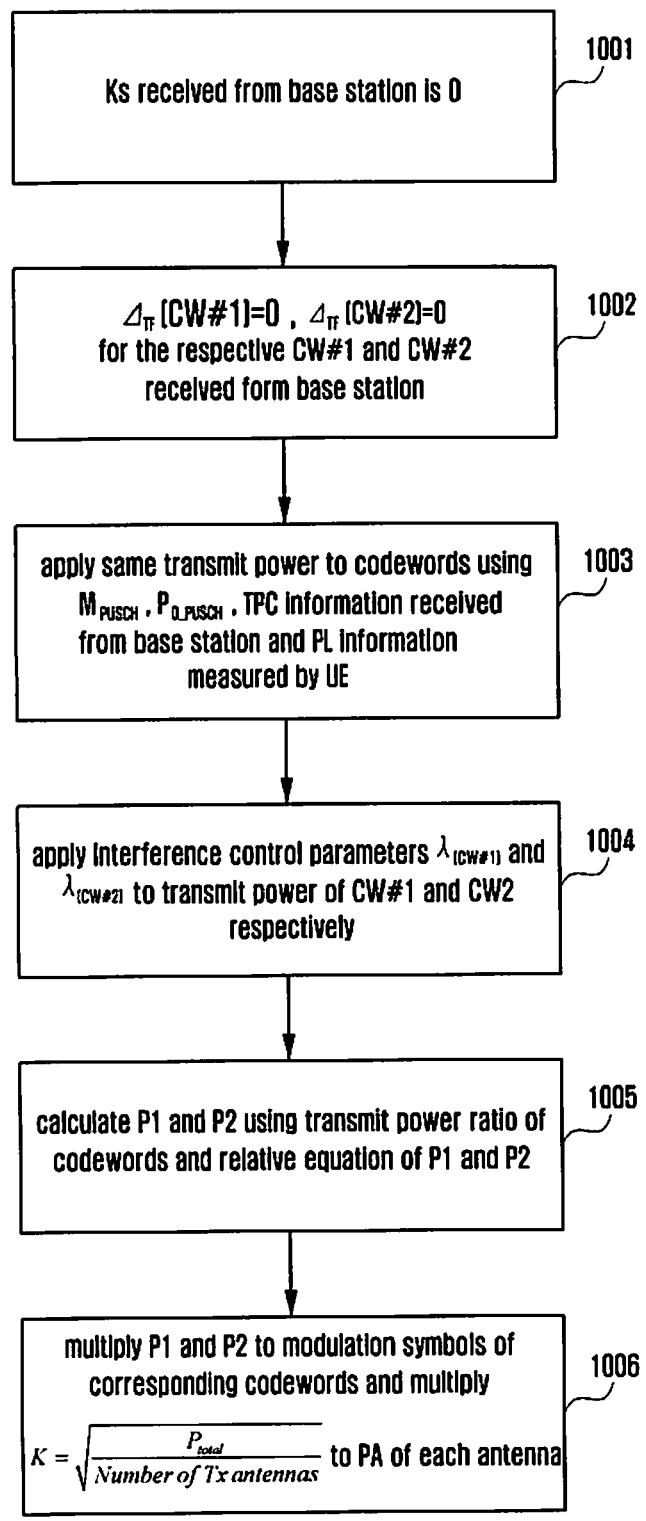
FIG. 10 is a flowchart illustrating a transmit power calculation process according to an embodiment of the present invention.

FIG. 10 is a flowchart illustrating a transmit power calculation process according to an embodiment of the present invention.

In order to control the adjacent cell interference amount caused by using CW#1 201 and CW#2 202 with $K_S=0$, in accordance with an embodiment of the present invention, offset parameters $\lambda_{CW\#1}$ and $\lambda_{CW\#2}$ are respectively applied to CW#1 201 and CW#2 202.

Steps 1001 to 1003 of FIG. 10 are identical with steps 901 to 903 of FIG. 9, a repetitive description of these steps will be omitted herein.

Referring to FIG. 10, in step 1004, the UE adjusts the transmit powers of CW#1 201 and CW#2 202 using $\lambda_{CW\#1}$ and $\lambda_{CW\#2}$, as given by Equation (19).

$$P_{dBm,total}(i,CW\#1)=10\log_{10}(M_{PUSCH}(i))+P_{O\_PUSCH}$$
$$(j)+\alpha(j)\cdot PL+f(i))+\lambda_{CW\#1}[dBm]$$

$$P_{dBm,total}(i,CW\#2)=10\log_{10}(M_{PUSCH}(i))+P_{O\_PUSCH}$$
$$(j)+\alpha(j)\cdot PL+f(i))+\lambda_{CW\#2}[dBm] \quad (19)$$

Steps 1005 and 1006 of FIG. 10 are also identical with step 804 and 805 of FIG. 8. Accordingly, a repetitive description of these steps will be omitted herein.

In order to control the adjacent cell interference caused by using CW#1 201 and CW#2 202 with $K_S=0$, in accordance with an embodiment of the present invention, a range of the TPC parameter $\delta_{PUSCH}$ is adjusted when two CWs are used.

In the current LTE standard, one CW is used for PUSCH, and the $\delta_{PUSCH}$ accumulated values are $\{-1, 0, +1, +3\}[dBm]$.

When two CWs are used, the transmit power increases, resulting in increased adjacent cell interference. In order to reduce this interference, the $\delta_{PUSCH}$ accumulated values can be redefined as $\{-1, 0, +1, +3\}$[dBm].

By using the $\delta_{PUSCH}$ accumulated value $-3$, it is possible to quickly reduce the interference. For the same reason, when using two CWs, the $\delta_{PUSCH}$ accumulated values can be redefined as $\{-6, -3, 0, +3\}$[dBm].

In the above-described embodiments, when $K_S=1.25$, $\Delta_{TF}$(CW#1) and $\Delta_{TF}$(CW#2) are used for CW#1 201 and CW#2 202. Alternatively, as will be described in the embodiments of the present invention below, a common $\Delta_{TF}$ is used for both the CW#1 201 and CW#2 202.

Figure 11:
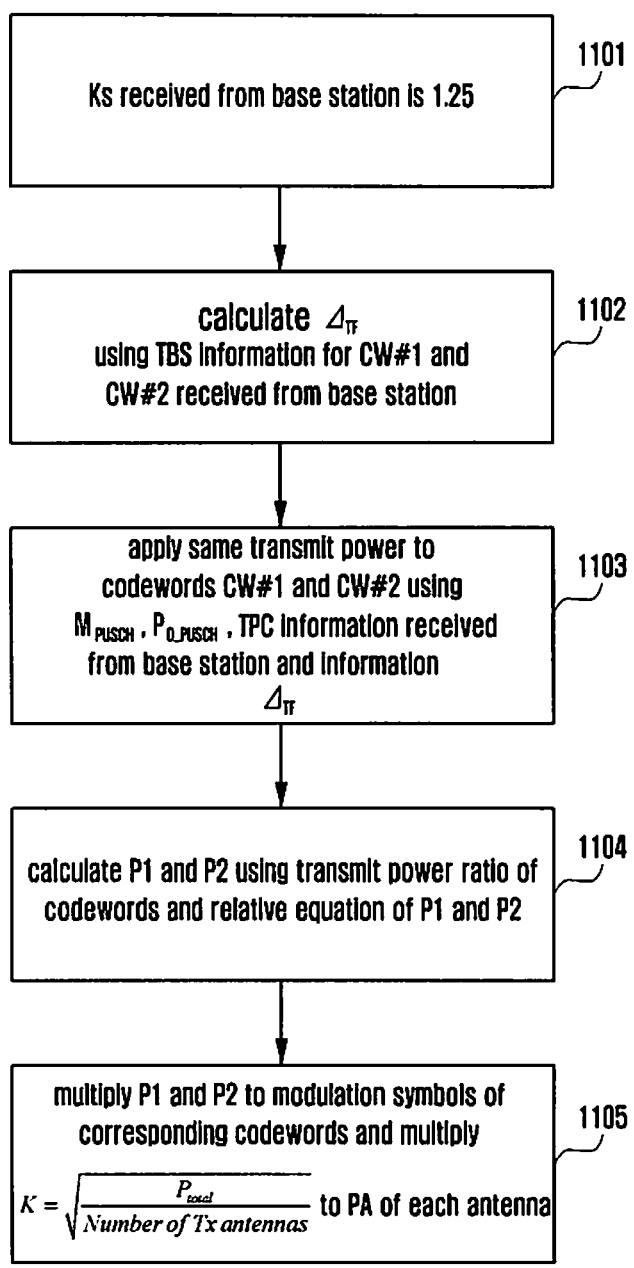
FIG. 11 is a flowchart illustrating a transmit power calculation process according to an embodiment of the present invention.

FIG. 11 is a flowchart illustrating a transmit power calculation process according to an embodiment of the present invention.

Referring to FIG. 11, the UE receives the cell specific parameter $K_S$ set to 1.25 ($K_S=1.25$) from the base station in step 1101. In step 1102, the UE calculates $\Delta_{TF}$.

In accordance with an embodiment of the present invention, four different methods can be used for calculating $\Delta_{TF}$ that can be commonly used for both the CW#1 201 and CW#2 202.

The first method for calculating $\Delta_{TF}$ is to use the maximum value of CW#1 and CW#2 as given by Equation (20).

$$\Delta_{TF}(i)=10\log_{10}(2^{\max(MPR(i,CW\#1),MPR(i,CW\#2))K_S}-1) \quad (20)$$

The second method for calculating $\Delta_{TF}$ is to use the minimum value of CW#1 and CW#2, as given by Equation (21).

$$\Delta_{TF}(i)=10\log_{10}(2^{\min(MPR(i,CW\#1),MPR(i,CW\#2))K_S}-1) \quad (21)$$

The third method for calculating $\Delta_{TF}$ is to use an average value of CW#1 and CW#2, as given by Equation (22).

$$\Delta_{TF}(i) = 10\log_{10}\left(2^{\left(\frac{MPR(i,CW\#1)+MPR(i,CW\#2)}{2}\right)K_S} - 1\right) \quad (22)$$

The fourth method for calculating $\Delta_{TF}$ is to use the sum of CW#1 and CW#2, as given by Equation (23).

$$\Delta_{TF}(i)=10\log_{10}(2^{(MPR(i,CW\#1)+MPR(i,CW\#2))K_S}-1) \quad (23)$$

After calculating $\Delta_{TF}$ using one of the four methods, the UE calculates the transmit powers of respective CW#1 and CW#2, as given by Equation (24), in step 1103. $\Delta_{TF}$ is commonly used for calculating both the CW#1 and CW#2.

$$P_{dBm,total}(i,CW\#1)=10\log_{10}(M_{PUSCH}(i))+P_{O\_PUSCH}(j)+\alpha(j)\cdot PL+f(i))+\Delta_{TF}[dBm]$$

$$P_{dBm,total}(i,CW\#2)=10\log_{10}(M_{PUSCH}(i))+P_{O\_PUSCH}(j)+\alpha(j)\cdot PL+f(i))+\Delta_{TF}[dBm] \quad (24)$$

Steps 1104 and 1105 of FIG. 11 are identical with steps 1005 and 1006 of FIG. 10. Accordingly, a repetitive description of these steps will be omitted herein.

If $K_S=1.25$, the adjacent cell interference amount varies according to the transmit power of the UE, which is determined depending on the two CWs. In order to control the interference amount, an offset parameter $\lambda$ is commonly used for the codewords. $\lambda$ also can be used to increase the transmit power level of the UE. A description is made of the method for increasing the transmit power level using $\lambda$ with reference to FIG. 12.

Figure 12:
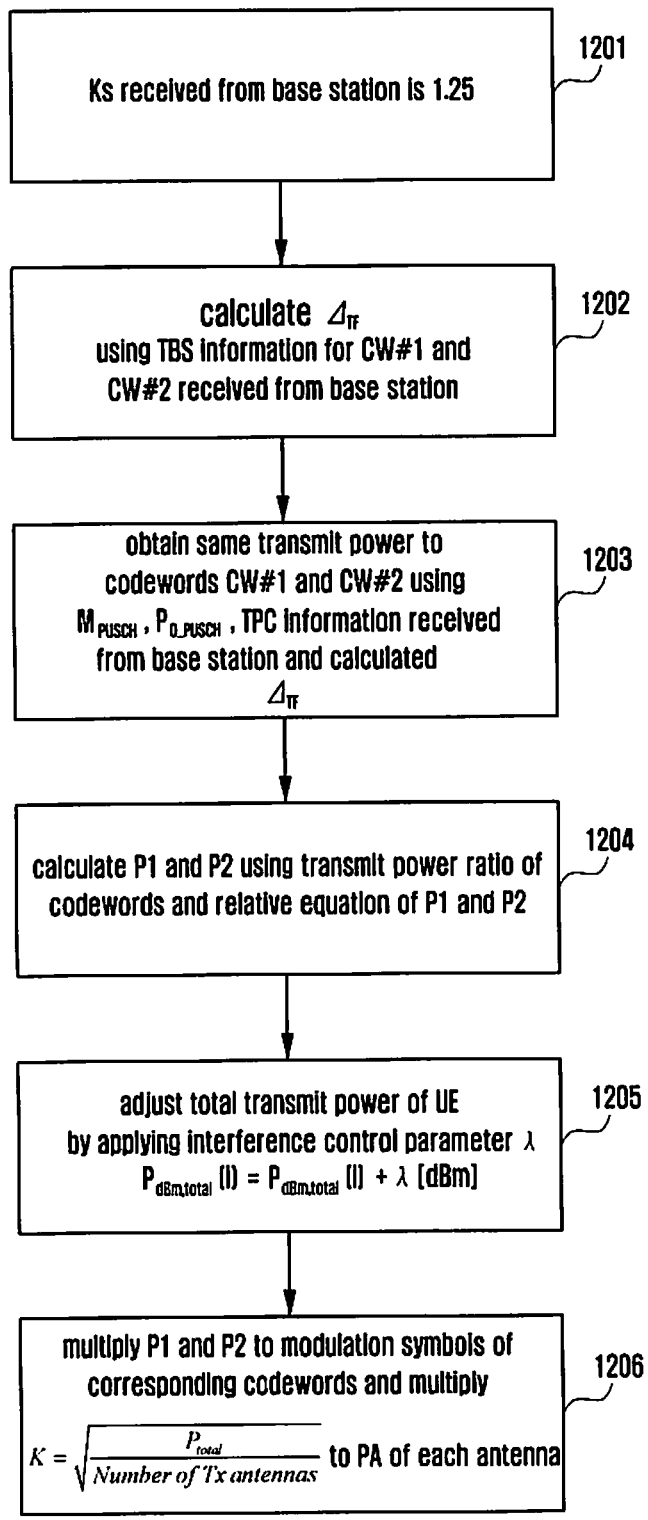
FIG. 12 is a flowchart illustrating a transmit power calculation process according to an embodiment of the present invention.

FIG. 12 is a flowchart illustrating a transmit power calculation process according to an embodiment of the present invention.

Steps 1201 to 1204 of FIG. 12 are identical with steps 1101 to 1104 of FIG. 11. Accordingly, a repetitive description of these steps will be omitted herein.

Referring to FIG. 12, in step 1205, the UE readjusts the total transmit power $P_{dBm,total}(i)=P_{dBm,total}(i)+\lambda$[dBm] using $\lambda$, as given by Equation (12).

Once $\sqrt{p_1}$ and $\sqrt{p_2}$ are acquired in step 1206, the UE multiples $\sqrt{p_1}$ and $\sqrt{p_2}$ to CW#1 201 and CW#2 202, respectively. As described with reference to FIG. 2, the value multiplied to the PA of each antenna is K, K is defined by $$K = \sqrt{\frac{P_{total}}{N}}.$$

Figure 13:
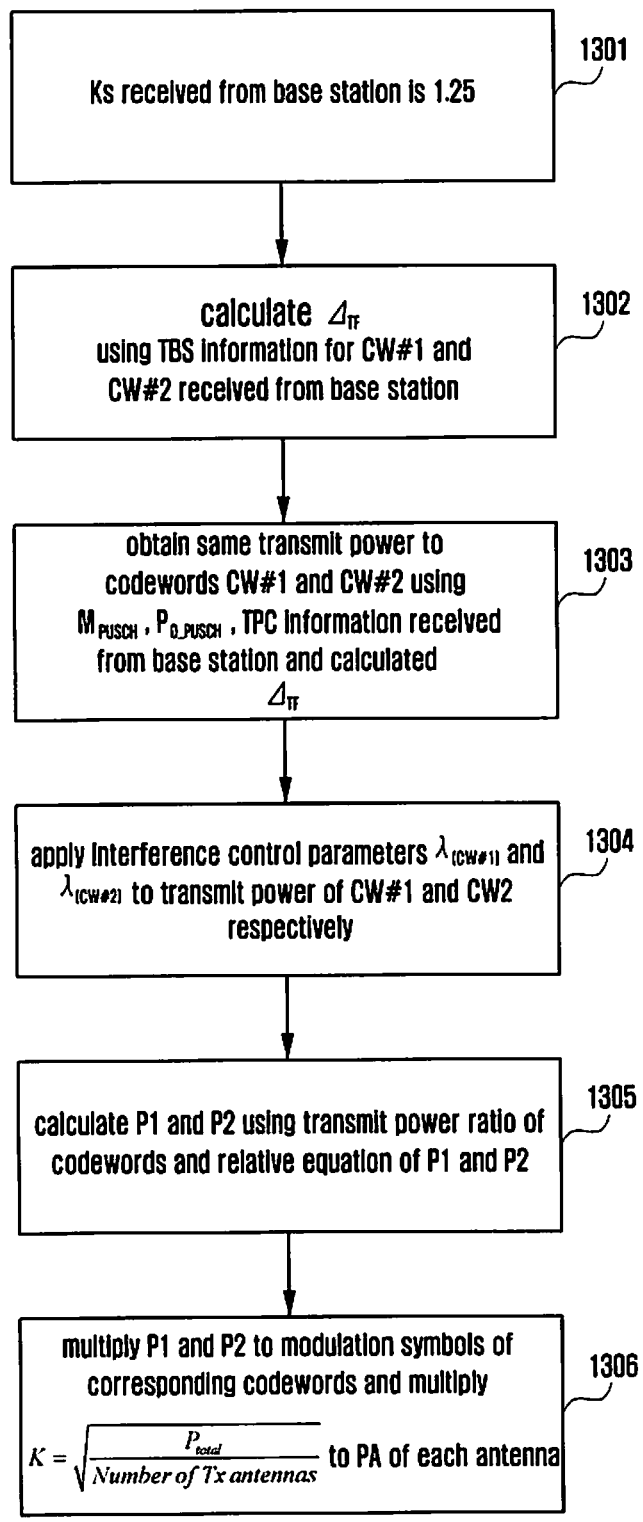
FIG. 13 is a flowchart illustrating a transmit power calculation process according to an embodiment of the present invention.

FIG. 13 is a flowchart illustrating a transmit power calculation process according to an embodiment of the present invention. More specifically, a method for controlling adjacent cell interference, which is increased by use of CW#1 and CW#2, using offset parameters $\lambda_{CW\#1}$ and $\lambda_{CW\#2}$ for the respective CW#1 and CW#2 is described with reference to FIG. 13.

Steps 1301 to 1303 of FIG. 13 are identical with steps 1101 to 1103 of the ninth embodiment depicted in FIG. 11, except that the UE derives a common transmit power for CW#1 201 and CW#2 202 at step 1303. Accordingly, a repetitive description of these steps will be omitted herein.

In step 1304, in order to control the adjacent cell interference, the UE adjusts the transmit powers of CW#1 201 and CW#2 202 using parameters $\lambda_{CW\#1}$ and $\lambda_{CW\#2}$, as given by Equation (25). $\lambda_{CW\#1}$ and $\lambda_{CW\#2}$ can be used for increasing the transmit power levels for CW#1 201 and CW#2.

$$P_{dBm,total}(i,CW\#1)=10\log_{10}(M_{PUSCH}(i))+P_{O\_PUSCH}(j)+\alpha(j)\cdot PL+f(i))+\Delta_{TF}(i)+\lambda_{CW\#1}[dBm]$$

$$P_{dBm,total}(i,CW\#2)=10\log_{10}(M_{PUSCH}(i))+P_{O\_PUSCH}(j)+\alpha(j)\cdot PL+f(i))+\Delta_{TF}(i)+\lambda_{CW\#2}[dBm] \quad (25)$$

Steps 1305 and 1306 of FIG. 13 are identical with steps 1104 and 1105 of FIG. 11. Accordingly, a repetitive description of these steps will be omitted herein.

In accordance with another embodiment of the present invention the UE controls the transmit powers of CW#1 and CW#2 using power control parameters transmitted by the base station.

More specifically, the UE can control the transmit power based on the power control parameters received from the base station, as given by Equation (26):

$$P_{PUSCH}(i,N)=\min\{P_{CMAX},10\log_{10}(M_{PUSCH}(i))+P_{O\_PUSCH}(j)+\alpha(j)\cdot PL+\Delta_{TF}(i,N)+f(i)\} \quad (26)$$

In Equation (26) $P_{PUSCH}(i,N)$ denotes the total transmit power of the UE, and N denotes a number of codewords. If two codewords are used, N is set to 2. Further, $P_{CMAX}$ denotes the maximum transmit power of the UE power class, and $10\log_{10}(M_{PUSCH}(i))+P_{O\_PUSCH}(j)+\alpha(j)\cdot PL+\Delta_{TF}(i,N)+f(i)$ denotes the transmit power in subframe i.

In Equation (26), the UE compares the maximum transmit power $P_{CMAX}$, with the transmit power $10\log_{10}(M_{PUSCH}(i))+P_{O\_PUSCH}(j)+\alpha(j)\cdot PL+\Delta_{TF}(i,N)+f(i)$ and transmits the least one of the two values.

In Equation (26), $\Delta_{TF}(i,N)$ can be expressed as $$\Delta_{TF}(i,N) = \left\{ \begin{array}{l} 10\log_{10}\left(\sum_{n=0}^{N-1}[L(n)\cdot(2^{MPR(i,n)K_s}-1)]\right), K_s = 1.25 \\ 0, K_s = 0 \end{array} \right\},$$

and two codewords are expressed as N=2. Further, n=0 indicates CW#1, and n=1 indicates CW#2.

In order to assign transmit powers for CW#1 and CW#2, the total transmit power of PUSCH is expressed in linear scale as given by Equation (27).

$$P_{PUSCH\_linear}(i,N) = 10^{P_{PUSCH}(i,N)/10} \tag{27}$$

Here, the transmit power ratio r between CW#1 and CW#2 is expressed in linear scale as given by Equation (28).

$$r = \frac{P_{linear}(0)}{P_{linear}(1)} = \frac{L(0)\cdot(2^{MPR(i,0)K_s}-1)}{L(1)\cdot(2^{MPR(i,0)K_s}-1)} \tag{28}$$

The transmit power $P_{linear}(0)$ of CW#1 calculated from Equations (27) and (28) in linear scale can be expressed as shown in Equation (29).

$$P_{linear}(0) = \frac{r}{1+r} P_{PUSCH\_linear}(i,N) \tag{29}$$

$$P_{linear}(1) = \frac{1}{1+r} P_{PUSCH\_linear}(i,N)$$

Finally, the UE divides the transmit power per codeword with L(n) to obtain the layer transmit powers of the respective codewords.

As described above, the transmit power control method operates in different manner depending on whether $K_S$ is set 0 or 1.25. The total transmit power can calculated with selective combination according to whether $K_S$ is 0 or 1.25.

In accordance with an embodiment of the present invention, a description will be made of the selective combination of total transmit power for CW#1 and CW#2 using the parameter $\Omega$ signaled in addition to $K_S$.

When the UE receives $\Omega=0$ from the base station, the UE can calculate the transmit power using Equation (30). At this time, the transmit powers of CW#1 and CW#2 can be calculated with Equation (31).

If $K_S=0$ in the formula for the transmission power of each codeword, $\Delta_{TF}(i,CW\#1)=0, \Delta_{TF}(i,CW\#2)=0$; and if $K_S=1.25$, $\Delta_{TF}(i,CW\#1)$ and $\Delta_{TF}(i,CW\#2)$ are calculated in consideration of TBS of each codeword as described above in relation with Equation (7). Thereafter, a lower of the total transmit power $P_{dBm,total}(i)$ and the maximum transmit power $P_{CMAX}$ is transmitted.

$$P_{dBm,total}(i) = P_{dBm,total}(i,CW\#1) + P_{dBm,total}(i,CW\#2) \text{ [dBm]} \tag{30}$$

$$P_{dBm,total}(i,CW\#1) = 10\log_{10}(M_{PUSCH}(i)) + P_{O\_PUSCH}(j) + \alpha(j)\cdot PL + f(i)) + \Delta_{TF}(i,CW\#1) \text{[dBm]}$$

$$P_{dBm,total}(i,CW\#2) = 10\log_{10}(M_{PUSCH}(i)) + P_{O\_PUSCH}(j) + \alpha(j)\cdot PL + f(i)) + \Delta_{TF}(i,CW\#2) \text{[dBm]} \tag{31}$$

When the base station has signaled $\Omega=1$ to the UE, the transmit power as defined by Equation (32) is used. That is, in order to prevent the total transmit power from increasing twice, when the number of codewords assigned to the UE increases from one to two, the total transmission power of the UE is calculated by subtracting X[dBm] from the sum of transmit powers of CW#1 and CW#2 that are derived from Equation (31). Here, X[dBm] is a value configured by the base station and signaled to the UE. When half of the sum of the transmit powers of CW#1 and CW#2 are to be selected in Equation (32), X[dBm] value is set as X=3[dBm].

If $K_S=0$ in the transmit power derivative formula for each code word of Equation (31), $\Delta_{TF}(i,CW\#1)=0, \Delta_{TF}(i,CW\#2)=0$; and if $K_S=1.25$, $\Delta_{TF}(i,CW\#1)$ and $\Delta_{TF}(i,CW\#2)$ are calculated in consideration of a TBS of each codeword, as described above in relation with Equation (7). Thereafter, the lower of the total transmit power $P_{dBm,total}(i)$ defined by Equation (32) and the maximum transmit power $P_{CMAX}$ is transmitted.

$$P_{dBm,total}(i) = P_{dBm,total}(i,CW\#1) + P_{dBm,total}(i,CW\#2) - X\text{[dBm]} \tag{32}$$

In the fourteenth embodiment, a description is made of the transmit power of the UE which varies according to the number of layers assigned to the UE in an uplink (UL) multiuser (MU) MIMO.

Figure 14:
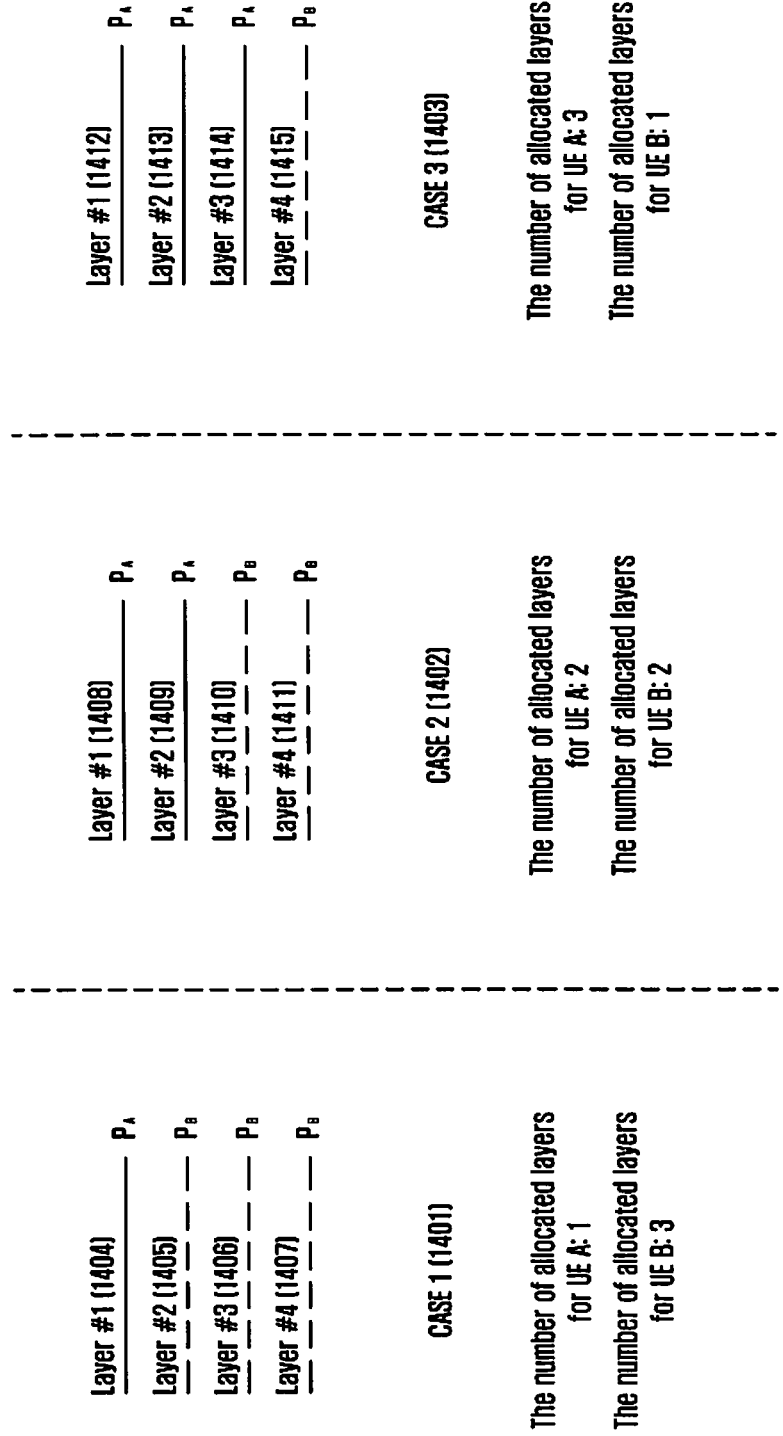
FIG. 14 is a diagram illustrating power assignments for layers of a UE in an MU-MIMO system according to an embodiment of the present invention.

FIG. 14 is a diagram illustrating power assignments for layers of a UE in a MultiUser (MU)-MIMO system according to an embodiment of the present invention. Specifically, with reference to FIG. 14, a description will made of the transmit power of the UE, which varies according to the number of layers assigned to the UE in an UpLink (UL) MU-MIMO system.

As shown in case 1 1401 of FIG. 14, a UE A is assigned a single layer (layer#1 1404) of which a transmit power is expressed by $P_A$. A UE B is assigned three layers (layer#2 1405, layer#3 1406, and layer#4 1407), each of which has a transmit power expressed by $P_B$. If the symbols carried on individual layers are transmitted over the same channel, the SINR per layer, from the view point of the base station receiver, can be expressed as shown in Equation (33).

$$\text{SINR of } layer1 = \frac{P_A}{3P_B + N_0} \tag{33}$$

$$\text{SINR of } layer2 = \frac{P_B}{2P_B + P_A + N_0}$$

$$\text{SINR of } layer3 = \frac{P_B}{2P_B + P_A + N_0}$$

$$\text{SINR of } layer4 = \frac{P_B}{2P_B + P_A + N_0}$$

If the total transmit power $P_A$ of the UE A is equal to the sum of the transmit powers of the UE B, i.e., $3P_B$, the SINR of the layer#1 assigned to the UE A is less than that of the layers #2, 3, and 4 assigned to the UE B from the view point of the base station receiver.

In the MU-MIMO system of case 2 1402, it is assumed that the UE A is assigned two layers (layer#1 1408 and layer#2 1409) and the UE B is assigned two layers (layer#3 1410 and layer#4 1411). If the layers pass the same channel, the per-layer SINRs received at the base station can be expressed by Equation (34).

$$\text{SINR of } layer1 = \frac{P_A}{P_A + 2P_B + N_0} \tag{34}$$

$$\text{SINR of } layer2 = \frac{P_A}{P_A + 2P_B + N_0}$$

-continued $$\text{SINR of } layer3 = \frac{P_B}{2P_A + P_B + N_0}$$

$$\text{SINR of } layer4 = \frac{P_B}{2P_A + P_B + N_0}$$

If the sum of total transmit power of the UE A, $2P_A$, is equal to the sum of the total transmit power of the UE B, $2P_B$, each of the SINRs of the layer#1 and layer#2 is equal to each of the SINRs of the layer#3 and layer#4 from the view point of the base station receiver.

In the MU-MIMO system of case 3 1403, it is assumed that the UE A is assigned three layers (layer#1 1412, layer#2 1413, and layer#3 1414) and the UE B is assigned one layer (layer#4 1415). If the layers pass the same channel, the per-layer SINRs received at the base station can be expressed by Equation (35):

$$\text{SINR of } layer1 = \frac{P_A}{2P_A + P_B + N_0} \quad (35)$$

$$\text{SINR of } layer2 = \frac{P_A}{2P_A + P_B + N_0}$$

$$\text{SINR of } layer3 = \frac{P_A}{2P_A + P_B + N_0}$$

$$\text{SINR of } layer4 = \frac{P_B}{3P_A + N_0}$$

If the total transmit power of the UE B, $P_B$, is equal to the sum of the total transmit power of the UE A, $3P_A$, the SINR of the layers #1, 2, and 3 assigned to the UE A is less than the SINR of the layer#4 assigned to the UE B, from the view point of the base station receiver, as shown in Equation (36).

If the adjacent UE A and UE B are assigned the same RB and the same MCS, the UE A and UE B are configured in the same total transmit power. Therefore, as the number of layers of each UE changes, the received SINRs of the respective layers differ from each other significantly from the view point of the base station receiver, as shown in Equations (33) and (36).

$$\text{SINR of } layer1 = \frac{P_A}{2P_A + P_B + N_0} = \frac{P_A}{5P_A + N_0} \quad (36)$$

$$\text{SINR of } layer2 = \frac{P_A}{2P_A + P_B + N_0} = \frac{P_A}{5P_A + N_0}$$

$$\text{SINR of } layer3 = \frac{P_A}{2P_A + P_B + N_0} = \frac{P_A}{5P_A + N_0}$$

$$\text{SINR of } layer4 = \frac{P_B}{3P_A + N_0} = \frac{3P_A}{3P_A + N_0}$$

In order to address the problem in which the SINRs of the individual layers differ from each other significantly in the MU-MIMO, i.e., in order to make the received SINRs equal from the view point of the base station receiver, the transmit power of the UE is calculated by Equation (37). Here, the transmit power is calculated in consideration of the offset value $X_{rank}(i)$ according to a number of layers (ranks).

$$P_{PUSCH}(i) = \min\{P_{CMAX}, 10\log_{10}(M_{PUSCH}(i)) + \quad (37)$$
$$P_{0\_PUSCH}(j) + \alpha(j) \cdot PL + \Delta_{TF}(i) + f(i) + \chi_{rank}(i)\}$$

$$\Delta_{TF}(i) = \begin{cases} 10\log_{10}(2^{func(MPR_1(i),MPR_2(i))K_s} - 1), & K_s = 1.25 \\ 0, & K_s = 0 \end{cases} \quad (38)$$

$\Delta_{TF}(i)$ in equation (37) can be obtained using one of Equations (20), (21), (22), and (23) in consideration of two codewords. $func(MPR_1(i),MPR_2(i))$ in Equation (38) can be obtained by one of the maximum, minimum, average, and sum operations of the Multi Point Relays to the two codewords CW#1 and CW#2.

If the adjacent UE A and UE B are assigned the same RB and same MCS, the offset value $\chi_{rank}(i)$ determined depending on the number of layers is added to the total transmit power of each UE. As the number of layers (ranks) increases, the offset value $\chi_{rank}(i)$ increases as shown in Table 1.

TABLE 1

| | Rank 1 | Rank 2 | Rank 3 | Rank 4 |
|---|---|---|---|---|
| $X_{rank}(i)$ | 0 (dBm) | 3 (dBm) | 4.77 (dBm) | 6 (dBm) |

In Table 1, if the number of layers assigned to the UE is 1, i.e., Rank 1, $\chi_{rank}(i)=0$ dBm and, if the number of layers increases to 2, $\chi_{rank}(i)=3$ dBm is added to the total transmit power. Also, for the increases to 3 and 4 of the number of layers, 3, 4.77 dBm and 6 dBm are added to the total transmit power of the UE, respectively.

As an alternative of using Table 1, a predetermined transmit power value $\delta$ can be added according to the number of layers (ranks) as given by Equation (39). That is, $\chi_{rank}(i)$ to be added to the transmit power is 0 for one layer (rank), $\delta$ for two layers, $2\delta$ for three layers, and $3\delta$ for four layers.

$$\chi_{rank}(i) = (rank-1)\delta \quad (39)$$

As described above, the transmit power of each UE in MU-MIMO system is set to be proportion to the number of layers.

Figure 15:
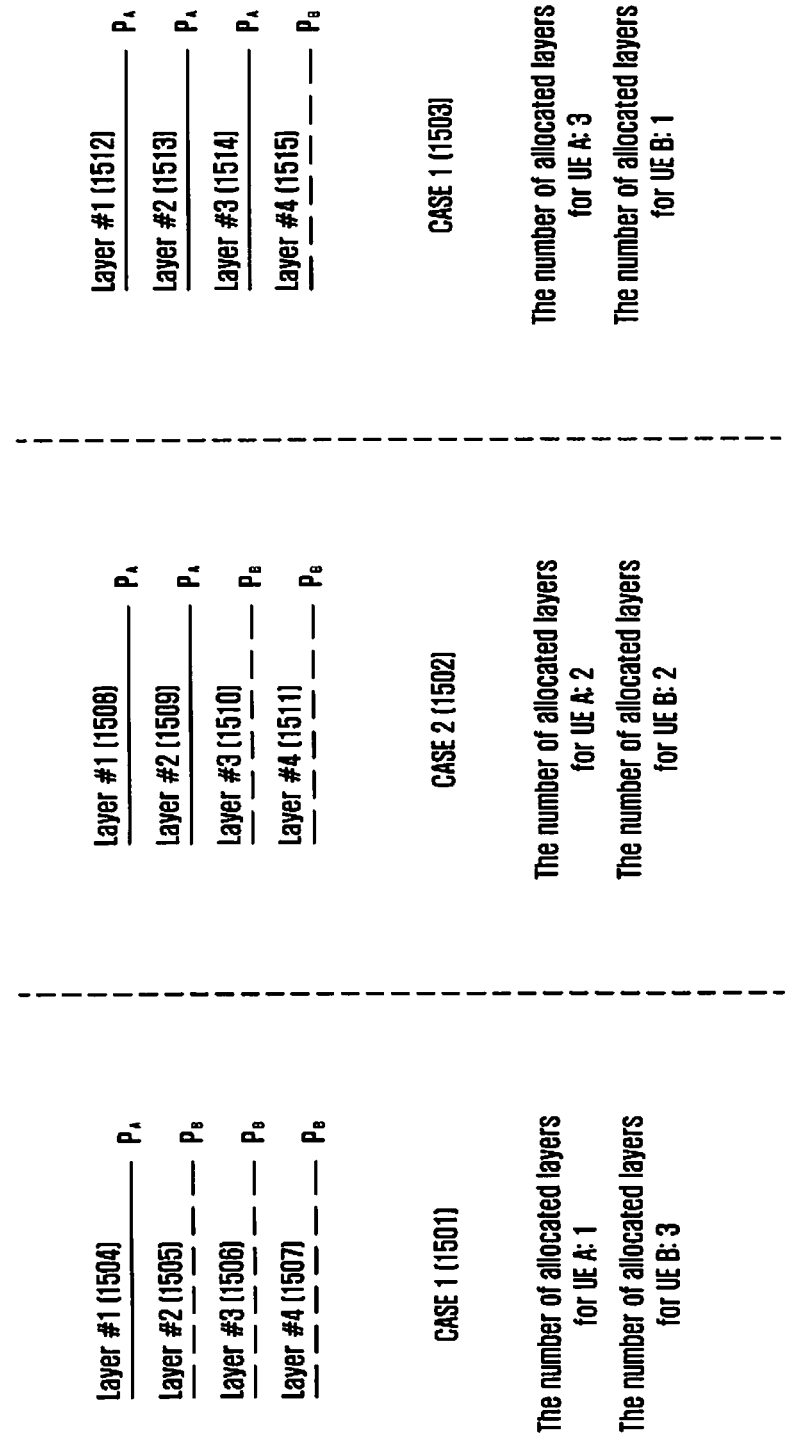
FIG. 15 is a diagram illustrating power assignments for layers of a UE in an MU-MIMO system according to another embodiment of the present invention.

FIG. 15 is a diagram illustrating power assignments for layers of the UE in an MU-MIMO system according to another embodiment of the present invention.

As shown in case 1 1501 of FIG. 15, the UE A is assigned one layer (layer#1 1504) of which a transmit power is expressed by $P_A$. The UE B is assigned three layers (layer#2 1505, layer#3 1506, and layer#4 1507), each of which has a transmit power expressed by $P_B$. Assuming that the individual layers pass the same channel, the SINRs of the respective layers are expressed as given by Equation (40), from the view point of the base station receiver.

$$\text{SINR of } layer1 = \frac{P_A}{3P_B + N_0} \quad (40)$$

$$\text{SINR of } layer2 = \frac{P_B}{2P_B + P_A + N_0}$$

$$\text{SINR of } layer3 = \frac{P_B}{2P_B + P_A + N_0}$$

$$\text{SINR of } layer4 = \frac{P_B}{2P_B + P_A + N_0}$$

If the two adjacent UEs, i.e., UE A and UE B, are assigned the same resource and the same MCS, the transmit power of the layer#1 of the UE A can be expressed as being equal to each of the transmit powers of the layer#2, layer#3, and layer#4 of the UE B using the offset value $\chi_{rank}(i)$, as shown in Equation (37). That is, the transmit power $P_A$ of the UE A is equal to the transmit power $P_B$ of the UE B.

Referring to Table 1, the transmit power of the UE, which increases by the offset value of 4.77 dBm of three layers, is distributed to the three layers of the UE B equally. Consequently, the SINR of the layer#1 assigned to the UE A is equal to the SINR of the layers #2, 3, and 4 assigned to the UE B, from the view point of the base station receiver.

In case 2 1502, it is assumed that the UE A is assigned two layers (layer#1 1508 and layer#2 1509) and the UE B is assigned two layers (layer#3 1510 and layer#4 1511). If the layers pass the same channel, the per-layer SINRs from the view point of the base station receiver can be expressed by Equation (41).

$$SINR \text{ of } layer1 = \frac{P_A}{P_A + 2P_B + N_0}$$

$$SINR \text{ of } layer2 = \frac{P_A}{P_A + 2P_B + N_0}$$

$$SINR \text{ of } layer3 = \frac{P_B}{2P_A + P_B + N_0}$$

$$SINR \text{ of } layer4 = \frac{P_B}{2P_A + P_B + N_0} \quad (41)$$

If the transmit power of each layer of UE A, $P_A$, is equal to the transmit power of each layer of the UE B, $P_B$, each of the SINRs of the layer#2 and layer#2 assigned to the UE A is equal to the SINRs of the layer#3 and layer#4 assigned to the UE B.

In case 3 1503, it is assumed that the UE A is assigned three layers (layer#1 1512, layer#2 1513, and layer#3 1514) and the UE B is assigned one layer (layer#4 1515). Assuming that the channels passing the respective layers are identical with each other, the per-layer SINRs received at the base station are expressed as given by Equation (42).

$$SINR \text{ of } layer1 = \frac{P_A}{2P_A + P_B + N_0}$$

$$SINR \text{ of } layer2 = \frac{P_A}{2P_A + P_B + N_0}$$

$$SINR \text{ of } layer3 = \frac{P_A}{2P_A + P_B + N_0}$$

$$SINR \text{ of } layer4 = \frac{P_B}{3P_A + N_0} \quad (42)$$

If the two adjacent UEs, UE A and UE B, are assigned the same resource and the same MCS, and if the transmit power $P_A$ of layer#1 1512, layer#2 1513, and layer#3 1514 of the UE A becomes equal to the transmit power PB of the layer#4 1515 of the UE B, using the offset value as shown in Equation (37), the SINR of the layer#4 assigned to the UE B is equal to the SINR of layers #1, 2, and 3 assigned to the UE A, as shown in Equation (43).

$$SINR \text{ of } layer1 = \frac{P_A}{2P_A + P_B + N_0} = \frac{P_A}{3P_A + N_0}$$

$$SINR \text{ of } layer2 = \frac{P_A}{2P_A + P_B + N_0} = \frac{P_A}{3P_A + N_0}$$

$$SINR \text{ of } layer3 = \frac{P_A}{2P_A + P_B + N_0} = \frac{P_A}{3P_A + N_0} \quad (43)$$

$$SINR \text{ of } layer4 = \frac{P_B}{3P_A + N_0} = \frac{P_A}{3P_A + N_0}$$

Based on the power assignment scheme considering the offset value determined depending on the number of layers in the MU-MIMO system, the base station is configured to use different power control scheme according to whether the UE is in Single User (SU) MIMO or MU-MIMO. That is, when the UE is in SU-MIMO, the base station controls such that the UE performs transmit power assignment according to the power control schemes described with reference to FIGS. 2-13, and when the UE is in MU-MIMO, controls such that the UE performs transmit power assignment in consideration of the offset value determined depending on the number of layers as described in with reference to FIGS. 14 and 15.

As described above, the uplink transmit power control method for the UE using multiple transmit antennas in an LTE-A system according to the present invention prevents a transmit power from increasing excessively, due to an increase of the number of codewords, by controlling the transmit power per codeword. Also, the uplink transmit power control method of the present invention is capable of adjusting the transmit power of the UE, thereby controlling the cell interference to a tolerable extent.

Although certain embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for controlling transmit power in a user terminal, the method comprising:
   receiving a parameter $K_S$ signaled by a higher layer and codeword-specific power control parameters from the base station;
   calculating gains using the codeword-specific power control parameters and the parameter $K_S$;
   calculating codeword-specific transmit powers according to the gains; and
   transmitting at least two codewords at the codeword-specific transmit powers.

2. The method of claim 1, wherein the parameter $K_S$ is set to one of 0 and 1.25.

3. The method of claim 2, wherein calculating the codeword-specific transmit powers comprises equaling a sum of the codeword-specific transmit powers of the at least two codewords to a transmit power using a single codeword, if $K_S$ is set to 0.

4. The method of claim 3, wherein calculating the codeword-specific transmit powers further comprises adjusting the codeword-specific transmit powers using an offset parameter $\lambda$.

5. The method of claim 3, wherein calculating the codeword-specific transmit powers further comprises controlling cell interference by adjusting the codeword-specific transmit powers with different offset parameters $\lambda_{CW\#1}$ and $\lambda_{CW\#2}$.

6. The method of claim 2, wherein calculating the codeword-specific transmit powers comprises:
   calculating a Transmit power control that is commonly used for calculating both the at least two codewords; and
   calculating the codeword-specific transmit powers according to a Modulation and Coding Scheme(MCS) of each the at least two codewords, if $K_S$ is set to 1.25.

7. A transmit power control apparatus comprising:
a transceiver configured to perform data communication; and
a controller configured to receive a cell-specific parameter $K_S$ given by a higher layer and codeword-specific power control parameters, to calculate gains using the codeword-specific power control parameters and the cell-specific parameter $K_S$, and to transmit at least two codewords at codeword-specific transmit powers calculated with the gains.

8. The transmit power control apparatus 7, wherein the parameter $K_S$ is set to one of 0 and 1.25.

9. The transmit power control apparatus of claim 8, wherein the controller is further configured to equal a sum of the codeword-specific transmit powers of the at least two codewords to a transmit power using a single codeword, if $K_S$ is set to 0.

10. The transmit power control apparatus of claim 9, wherein the controller is further configured to adjust the codeword-specific transmit powers using an offset parameter $\lambda$.

11. The transmit power control apparatus of claim 9, wherein the controller is further configured to control cell interference by adjusting the codeword-specific transmit powers with different offset parameters $\lambda_{CW\#1}$ and $\lambda_{CW\#2}$.

12. The transmit power control apparatus of claim 8, wherein the controller is further configured to calculate a Transmit power control that is commonly used for calculating both the at least two codewords, and to calculate transmit powers according to a Modulation and Coding Scheme (MCS) of each the at least two codewords, if $K_S$ is set to 1.25.

13. A method for transmitting parameters in a base station, the method comprising:
transmitting a parameter $K_S$ signaled by a higher layer and codeword-specific power control parameters to a terminal; and
receiving at least two codewords at the codeword specific transmit power from the terminal,
wherein the parameters are used for calculating gains using the codeword-specific power control parameters and the parameter $K_S$, and for calculating the codeword-specific transmit powers according to the gains in the terminal.

14. The method of claim 13, further comprising:
checking per-codeword received power strengths received from the terminal; and
updating the codeword-specific power control parameters based on the per-codeword received power strengths.

15. A base station for transmitting parameters, the base station comprising:
a transceiver configured to perform data communication; and
a controller configured to transmit a parameter $K_S$ signaled by a higher layer and codeword-specific power control parameters to a terminal, and to receive at least two codewords at the codeword specific transmit power from the terminal,
wherein the parameters are used for calculating gains using the codeword-specific power control parameters and the parameter $K_S$, and for calculating the codeword-specific transmit powers according to the gains in the terminal.

16. The base station of claim 15, wherein the controller is further configured to check per-codeword received power strengths received from the terminal and to update the codeword-specific power control parameters based on the per-codeword received power strengths.

* * * * *